US012725588B1

(12) United States Patent
Macaluso

(10) Patent No.: US 12,725,588 B1
(45) Date of Patent: Sep. 1, 2026

(54) TRUMPET WITH IMPROVED FEATURES AND METHODS FOR MAKING SAME

(71) Applicant: Charles A Macaluso, Palm City, FL (US)

(72) Inventor: Charles A Macaluso, Palm City, FL (US)

( * ) Notice: Subject to any disclaimer, the term of this patent is extended or adjusted under 35 U.S.C. 154(b) by 0 days.

(21) Appl. No.: 19/196,547

(22) Filed: May 1, 2025

(51) Int. Cl.
*G10D 7/10* (2006.01)

(52) U.S. Cl.
CPC .................................... *G10D 7/10* (2013.01)

(58) Field of Classification Search
CPC ........................................................ G10D 7/10
USPC ........................................................... 84/388
See application file for complete search history.

(56) References Cited

U.S. PATENT DOCUMENTS

| | | | | | |
|---|---|---|---|---|---|
| 214,498 | A * | 4/1879 | Esbach | G10D 9/04 | 84/388 |
| 670,365 | A * | 3/1901 | Buescher | G10D 9/04 | 310/249 |
| D41,613 | S | 7/1911 | Hurtt | | |
| 1,003,931 | A * | 9/1911 | Martin | G10D 9/04 | 84/388 |
| D46,501 | S | 10/1914 | Holton | | |
| D48,319 | S | 12/1915 | Higgins | | |
| D55,149 | S | 5/1920 | Cheney | | |
| 1,588,390 | A | 6/1926 | Suchy | | |
| 1,662,076 | A | 3/1928 | Newman | | |
| 1,852,749 | A | 4/1932 | Morrison | | |
| 1,924,399 | A * | 8/1933 | Fiorino | G10D 7/10 | 84/395 |
| 2,181,346 | A | 11/1939 | Selmer | | |
| D119,755 | S | 4/1940 | Johnson | | |
| 2,320,202 | A | 5/1943 | Thompson | | |
| 2,320,203 | A * | 5/1943 | Thompson | G10D 7/10 | 984/135 |
| RE22,949 | E | 12/1947 | Forssberg | | |
| 2,794,358 | A * | 6/1957 | Albert | G10D 9/04 | 84/390 |

(Continued)

FOREIGN PATENT DOCUMENTS

| | | | | |
|---|---|---|---|---|
| DE | 19721870 | A1 * | 11/1998 | G10D 7/10 |
| DE | 10154411 | A1 | 9/2002 | |

(Continued)

OTHER PUBLICATIONS

Macaluso et al., "Trumpet with near-perfect harmonicity: Design and acoustic results," J. Acoust Soc. Am. 129 (1), Jan. 2011 (11 pages).

(Continued)

*Primary Examiner* — Christina M Schreiber
(74) *Attorney, Agent, or Firm* — Clark Hill PLC; Ralph Selitto; John K. Kim

(57) ABSTRACT

A discontinuity-free trumpet is presented. It maintains a circular cross-sectional shape throughout the length of the instrument, and its centerline in every section is straight, a tangent circular arc, or composed of multiple tangent circular arcs. Improvements to the leadpipe, mouthpiece receiver, tuning slide, valve assembly and bell to this end are disclosed. Also, through careful design of the bell, using a modified Bessel horn shape as the basis, the harmonics of the trumpet are corrected such that they are all multiples of one another, encompassing hundreds of harmonics or more.

22 Claims, 20 Drawing Sheets

(56) References Cited

U.S. PATENT DOCUMENTS 2,947,211 A 8/1960 Shuman
3,329,056 A 7/1967 Kostenko
3,555,955 A * 1/1971 Sahaida .................... G10D 7/10 84/397
3,631,755 A * 1/1972 Glantz ...................... G10D 7/10 84/390
3,871,094 A 3/1975 Nichols
3,886,837 A * 6/1975 Veneklasen .............. G10D 9/04 84/397
3,933,079 A * 1/1976 Gillespie .................. G10D 7/10 84/395
4,083,287 A 4/1978 Suzuki
4,102,236 A * 7/1978 North ..................... G10D 13/22 84/411 R
4,178,829 A 12/1979 Wolford
4,203,338 A 5/1980 Vidas
4,273,020 A * 6/1981 Happe ...................... G10D 7/10 84/394
4,276,804 A * 7/1981 Holland ................... G10D 9/01 84/394
4,395,933 A 8/1983 Shepley
4,512,233 A * 4/1985 Holland ................... G10D 9/01 84/394
4,515,060 A 5/1985 Ferron
4,515,061 A * 5/1985 Ferron ..................... G10D 7/10 84/394
4,657,182 A * 4/1987 Hoshi .................. A47G 21/189 285/302
4,779,465 A 10/1988 Stearns et al.
4,840,250 A 6/1989 Novy
4,885,971 A 12/1989 Ostendorf
4,993,303 A * 2/1991 Clark ....................... G10D 9/04 84/394
5,012,714 A 5/1991 Kongou
5,052,261 A 10/1991 Lessen
5,272,275 A 12/1993 Kunimoto
5,351,593 A 10/1994 Ostendorf
5,353,673 A 10/1994 Lynch
5,361,668 A * 11/1994 Andersen ................. G10D 9/04 84/392
5,503,055 A * 4/1996 Hamanaga ............... G10D 9/08 84/395
5,847,300 A * 12/1998 Hackl ...................... G10D 9/03 84/398
D407,100 S 3/1999 Marcinkiewicz
5,900,563 A * 5/1999 Leonard ................... G10D 9/04 84/390
5,965,833 A * 10/1999 Lindberg ................. G10D 9/04 84/390
5,969,280 A 10/1999 Marcinkiewicz
6,008,443 A * 12/1999 Honorato Ibanez ..... G10D 9/03 84/394
6,008,444 A 12/1999 Chesko et al.
6,297,436 B1 * 10/2001 Adams ..................... G10D 7/10 84/393
6,717,041 B1 * 4/2004 Hilliard .................... G10D 9/01 84/394
6,815,599 B2 11/2004 Asahi
7,078,605 B2 7/2006 Love
7,112,735 B2 * 9/2006 Shire ........................ G10D 9/04 84/390
7,329,809 B2 2/2008 Marosevic
7,335,831 B2 * 2/2008 Laukat ..................... G10D 9/08 84/400
7,501,566 B2 * 3/2009 Glazer ..................... G10D 7/10 84/388
7,554,028 B2 6/2009 Fujii
7,615,700 B2 11/2009 DiClaudio
7,786,372 B2 * 8/2010 Sawada .................... G10D 9/04 84/723
7,858,871 B2 12/2010 Fujii et al.
7,999,164 B2 * 8/2011 Satomi ..................... G10D 9/04 84/380 R
8,247,675 B2 8/2012 Griego
8,324,491 B1 * 12/2012 Malluck ................... G10D 9/08 84/387 R
8,686,267 B2 4/2014 Takahashi
9,318,082 B2 4/2016 Dixon
D771,742 S 11/2016 Harper
9,595,246 B2 * 3/2017 Hagstrom ................ G10D 7/10
9,765,901 B2 * 9/2017 Harper .................. F16K 31/086
11,538,447 B2 12/2022 Wanne
2007/0221038 A1 * 9/2007 Sawada .................... G10D 7/10 84/380 R
2007/0234887 A1 * 10/2007 Sawada .................... G10D 9/04 84/723
2010/0236379 A1 * 9/2010 Wilk ........................ G10D 9/04 84/390
2015/0317961 A1 * 11/2015 Harper ..................... G10D 7/10 84/392
2016/0322035 A1 * 11/2016 Ban .......................... G10D 9/01
2019/0213981 A1 * 7/2019 Hunsicker ................ G10D 7/10
2022/0398999 A1 * 12/2022 Clissold ................... G10D 9/04
2023/0317036 A1 10/2023 Wanne

FOREIGN PATENT DOCUMENTS

DE 102013009828 A1 * 12/2014 ............. A63B 23/16
DE 202025001457 U1 * 8/2025 ............... G10D 7/10
EP 2557563 A2 * 2/2013 ............... G10D 9/06
EP 3940689 A1 * 1/2022 ............... G10D 7/10
EP 4102496 A1 * 12/2022 ............... G10D 9/04
FR 2713815 A1 * 6/1995 ............... G10D 9/01
FR 2791164 A1 8/2001

OTHER PUBLICATIONS

Macaluso, “The Trumpet Construction & Performance,” Brass Technology Press, 1997 (21 pages).

* cited by examiner

TRUMPET WITH IMPROVED FEATURES AND METHODS FOR MAKING SAME

FIELD OF THE INVENTION

The present invention relates to musical instruments, and more particularly, to trumpets having features designed to improve the playability and sound of the trumpet.

BACKGROUND OF THE INVENTION

Professional trumpeters seek a trumpet with a near-perfect high register acoustic response and near-perfect pitches. Existing (i.e., prior art) professional trumpet models, such as those shown in FIGS. 1A and 1B, have reduced upper register instrument response. Trumpeters use increased diaphragmatic pressure, and playing the instrument becomes strenuous. A few gifted professional trumpeters can accommodate such a fault and play inspiring music in the highest register, but it requires unusual effort and skill.

Various discontinuities found within prior art trumpets interfere with the player's vibrating lips, prevent clean note attacks, and prevent playing the trumpet at a low dynamic volume. Six such discontinuities within the prior art trumpet mouthpiece, receiver gap and leadpipe are illustrated in FIG. 1B (marked "D").

SUMMARY

The invention provides an innovative acoustically perfect trumpet design using mathematically continuous inside-wall-shapes based upon complex plane wave acoustic theory and mathematics.

In an exemplary embodiment, the present invention includes a trumpet having mathematically differentiable inside wall shapes, which eliminate the discontinuities present in prior art trumpets that interfere with the player's vibrating lips, prevent clean note attacks, and prevent playing the instrument at a low dynamic volume.

In an exemplary embodiment, the present invention includes a trumpet having mathematically continuous inside-wall-shapes within the mouthpiece and the leadpipe and equal values of the diameter and first and second derivatives of radius of the mouthpiece backbore exit and the leadpipe entrance.

In an exemplary embodiment, the present invention includes a trumpet having a leadpipe with a large initial diameter and taper rate, which is not used in prior art trumpets. The instrument attains a reduced blowing resistance and is easier to play in the highest register.

In an exemplary embodiment, the present invention includes a trumpet having a leadpipe with a mathematically continuous non-linear taper rate, which eliminates discontinuities.

In an exemplary embodiment, the present invention includes a trumpet having a leadpipe with reduced wall thickness, which is not used on existing trumpets and increases the trumpet vibrational response.

In an exemplary embodiment, the present invention includes a trumpet having a tuning slide crook with a smaller initial bend radius, which produces a premature acoustic reflection that increases the apparent acoustic response.

In an exemplary embodiment, the present invention includes a trumpet having valves with mathematically calculated acoustically correct valve slide lengths, which are added to the open valve trumpet length to decrease the note pitches in semitone increments and provide perfect note pitches.

In an exemplary embodiment, the present invention includes a trumpet having larger diameter valve pistons (than those in prior art trumpets) and smaller diameter piston port tubes (than those in prior art trumpets) with straight, circular arc, or tangent circle arc centerlines, which eliminate the discontinuities found in prior art trumpets.

In an exemplary embodiment, the present invention includes a trumpet having larger valve slide diameters than those in prior art trumpets, which compensates for the increased fluid dynamic head loss in the smaller diameter piston port tube diameters.

In an exemplary embodiment, the present invention includes a trumpet having smaller diameter piston port tubes than those in prior art trumpets, which allow the piston throw distance to be reduced and provides for faster valve fingering.

In an exemplary embodiment, the present invention includes a trumpet having a Bessel horn bell inside wall shape with a mathematically modified small end, which eliminates the discontinuity where the hyperbolic bell connects to cylindrical tubing.

In an exemplary embodiment, the present invention includes a trumpet having a Bessel horn bell inside wall shape with a mathematically modified shape, which uses fifteen perturbation functions to attain harmonically related frequencies for resonance two through sixteen and produces perfect pitch open valve notes.

In an exemplary embodiment, the present invention includes a trumpet having a mathematically modified Bessel horn bell flare inside-wall-shape, which uses a polynomial equation to attain harmonically related frequencies for resonances greater than the sixteenth and produces a perfect acoustic response in all playing registers. This cancels transit time dispersion and returns a coherent reflected pulse at the mouthpiece In an exemplary embodiment, the present invention includes a trumpet having a bell inside wall shape produced by spinning a bell blank into a straight axis bell with a tapered wall thickness, an integral bell bead, and metal in a fully hard temper, which provides for increased vibration response. The straight axis spun bell is subsequently bent to form the tail bend.

BRIEF DESCRIPTION OF FIGURES

For a more complete understanding of the present disclosure, reference is made to the following figures, in which.

DETAILED DESCRIPTION OF EXEMPLARY EMBODIMENTS

The following disclosure is presented to provide an illustrative description of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms “a”, “an”, “the”, and “one” include the plural referents unless otherwise stated. Additionally, the terms “comprises” and “comprising” when used herein specify that certain features are present in that embodiment; however, this phrase should not be interpreted to preclude the presence or addition of additional steps, operations, features, components, and/or groups thereof.

All examples and conditional language recited herein are intended for pedagogical purposes to aid the reader in understanding the principles of the invention and the concepts contributed thereby to furthering the relevant art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 2:
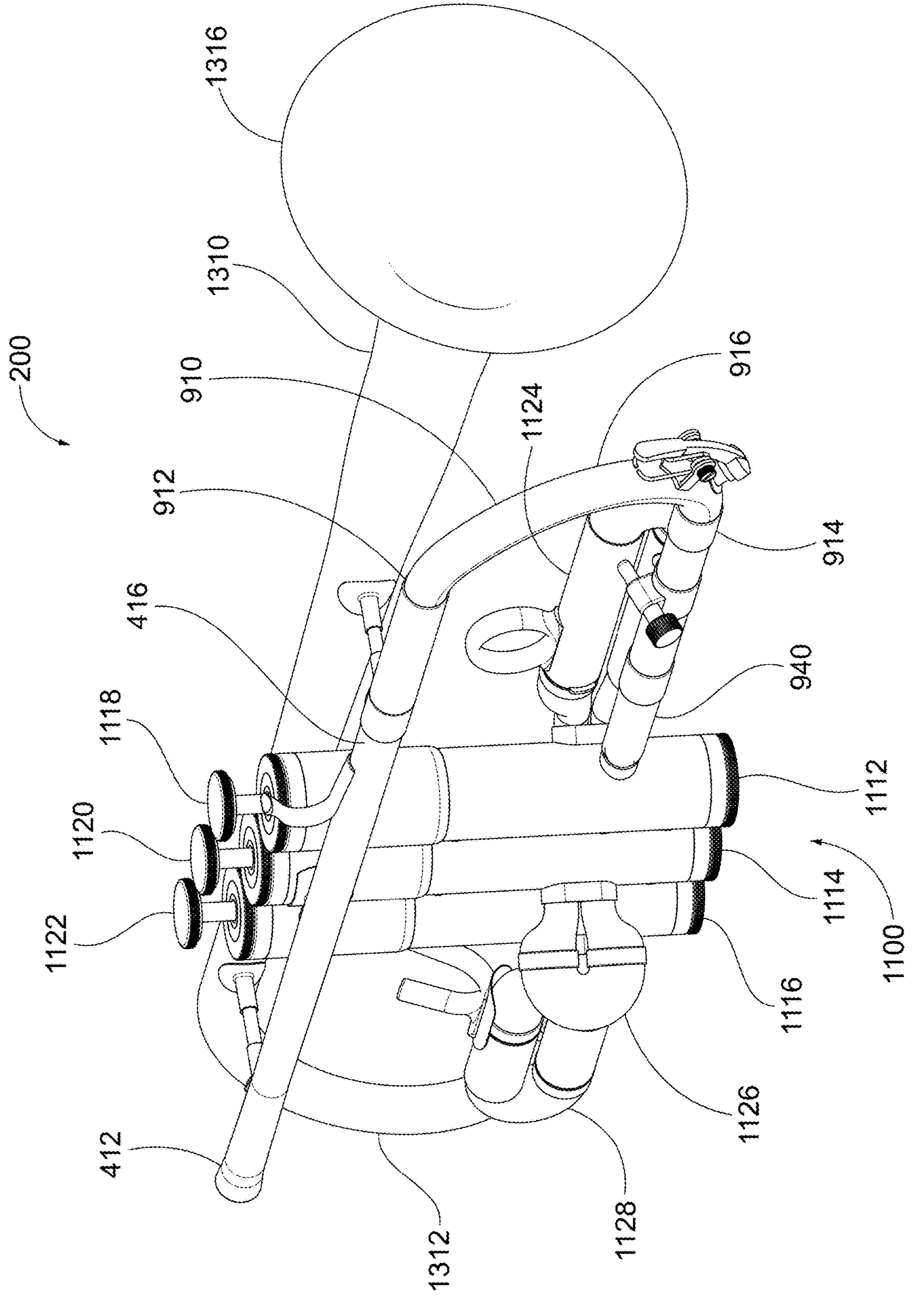
FIG. 2 is a top perspective view of a trumpet according to an embodiment of the present invention.
Figure 3:
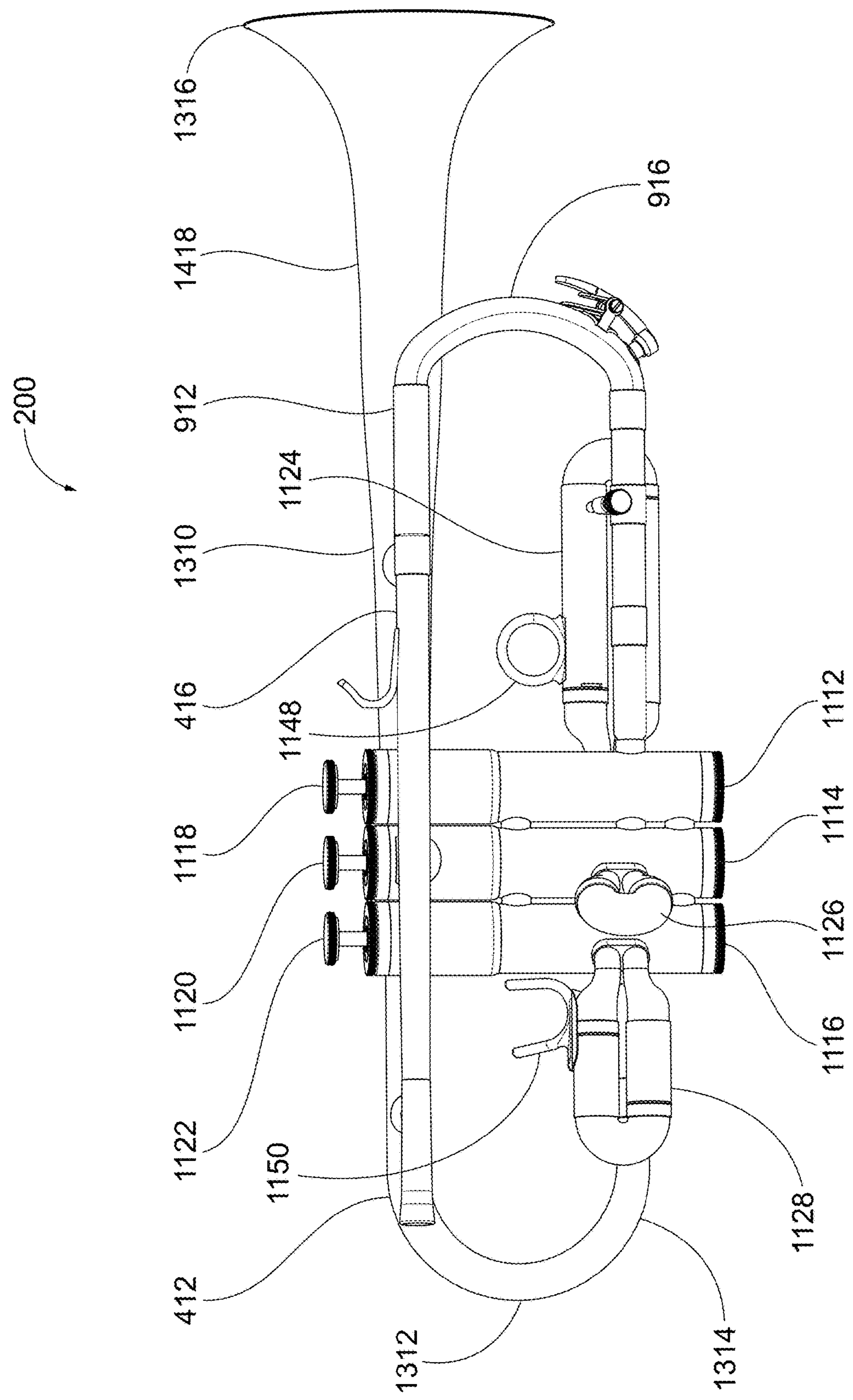
FIG. 3 is a side elevational view of the trumpet illustrated in FIG. 2.

An inventive trumpet 200 is shown in FIGS. 2 and 3. Generally speaking, the trumpet 200 has a mouthpiece receiver (i.e., receiver assembly) 412, a valve assembly 1100, a bell (i.e., bell assembly) 1310, a tuning slide (i.e., tuning slide assembly) 910, and valve cluster transitions 940. All of these parts have been improved in a variety of ways. Most of the changes are directed at minimizing and or eliminating mathematical discontinuities in order to arrive at a trumpet that is easier to play and produces a better sound overall.

Figure 5:
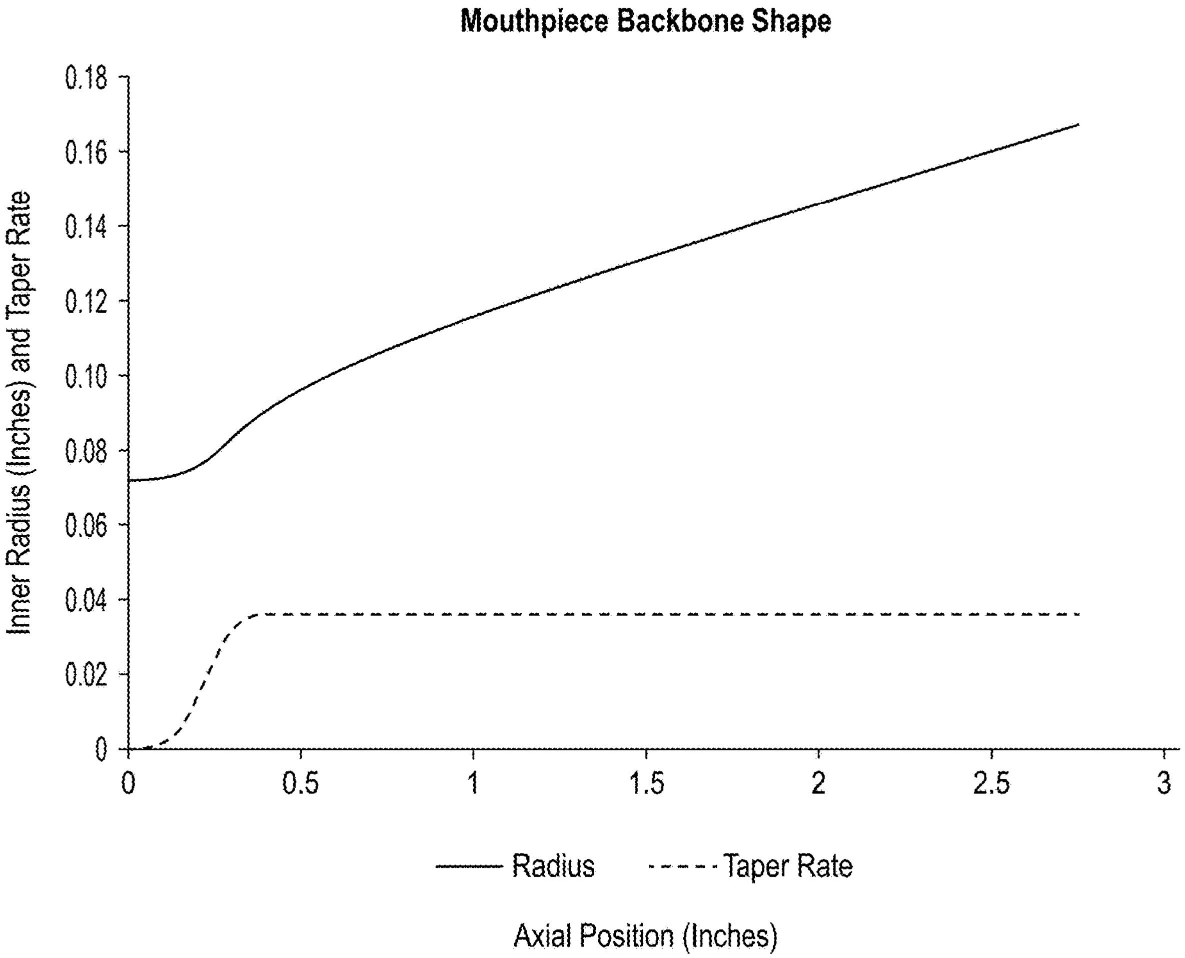
FIG. 5 is a graph of mouthpiece backbore shape for a mouthpiece suitable for use with the trumpet.

Discontinuity-free mouthpieces are known in the art. Although not required for use in the present invention, the exemplary design presented herein was tailored to work best with the number two mouthpiece backbore made by GR Mouthpieces. FIG. 5 shows the mouthpiece backbore shape as well as its first derivative. While not strictly a part of the present invention, a discontinuity free mouthpiece is highly desirable. Given the typical discontinuities caused by the gap joining the lead pipe with the mouthpiece, the backbore shape must be considered in order to create a discontinuity free transition between the mouthpiece inside-wall-shape and the leadpipe inside-wall-shape.

The dimensions of an exemplary embodiment of the present invention are provided in the present disclosure. However, it should be understood that the present invention is not limited to such a design and/or dimensions, and other designs and/or dimensions may be able to achieve the utility of the present invention. Such alternate designs should be understood to be within the scope of the present invention, as it relates to minimizing discontinuities in a trumpet.

Mouthpiece Receiver

Figure 1A:
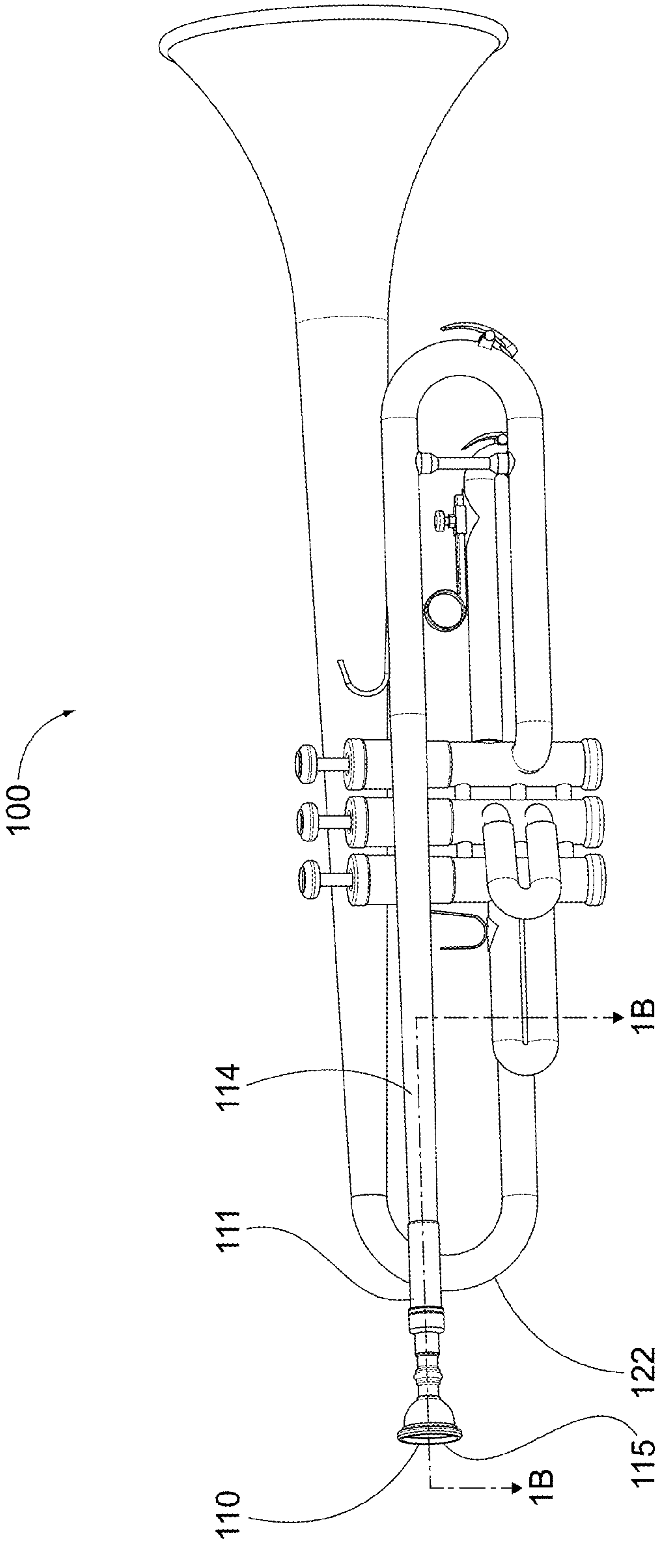
FIG. 1A (PRIOR ART)
FIG. 1A is side view of a prior art trumpet.
Figure 1B:
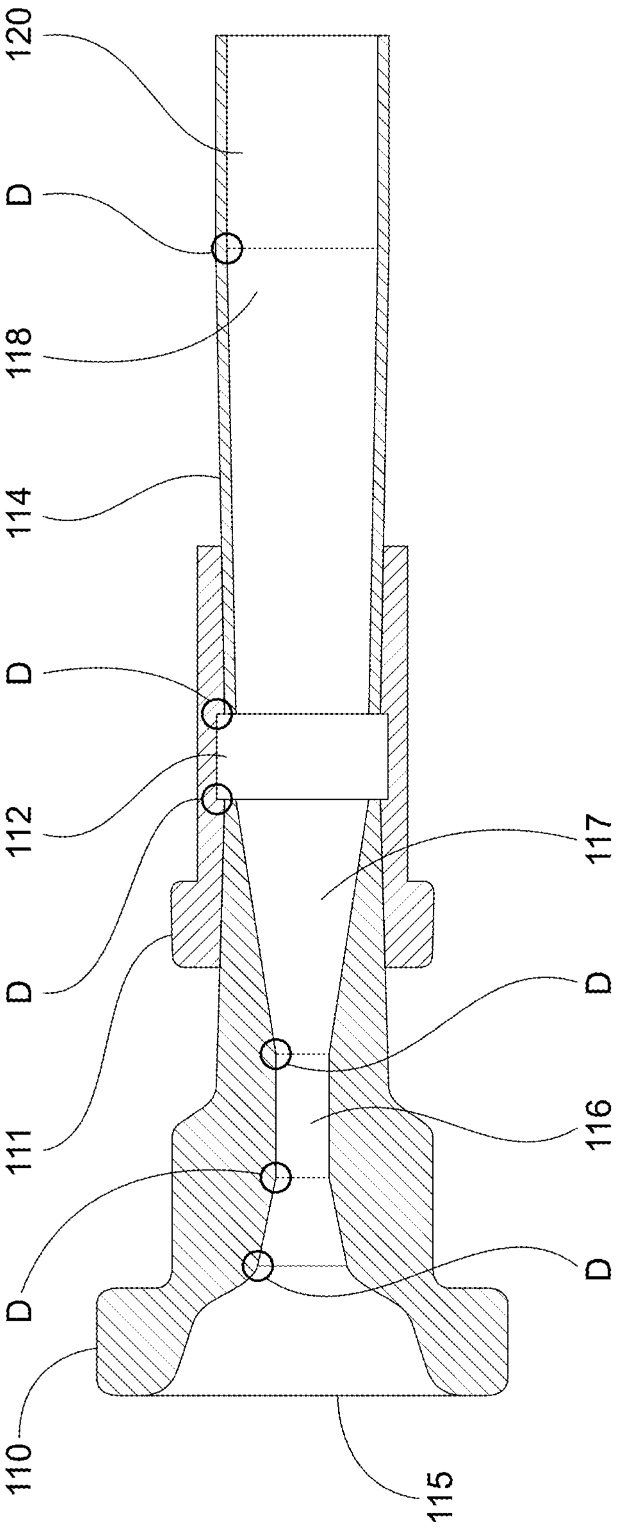
FIG. 1B (PRIOR ART)
FIG. 1B is a cross-sectional view of mouthpiece and leadpipe portions of the prior art trumpet of FIG. 1A, as taken along lines 1B-1B.

In a conventional trumpet (e.g., that which is shown in FIGS. 1A and 1B), a large discontinuity is associated with where the mouthpiece 110 connects to the trumpet mouthpiece receiver 111. Specifically, when mouthpiece 110 is inserted into trumpet mouthpiece receiver 111, a gap 112 is created leading into leadpipe 114. Through the design of the present invention, the negative effects of the gap 112 in a conventional trumpet (see FIGS. 1A and 1B) are greatly mitigated or even removed altogether. For typical mouthpieces, there are discontinuities in the cup 115, at the beginning of the bore 116 of mouthpiece 110, and at the onset of backbore 117. Furthermore, discontinuities in the trumpet proper are formed where mouthpiece 110 meets gap 112 and where gap 112 joins leadpipe 114. Leadpipe 114 in most conventional trumpets includes a tapered region 118 and cylindrical region 120, and yet another discontinuity is present at their junction. A first source of discontinuities can be eliminated with a discontinuity free mouthpiece 411, which is known in the art.

The gap 414 (see FIG. 4B) connects to the tapered portion of the mouthpiece known as the backbore 417. When a pressure wave passes through the mouthpiece 411 and exits via the backbore 417, it adapts to the shape of the backbore 417 and to the shape of what follows it. In conventional trumpets, the sudden increase in diameter upon the pressure wave reaching the gap 112 causes a discontinuity, and there is unwanted reflection back towards the player. Additionally, the pressure wave can experience a further discontinuity upon entering the leadpipe 114 as the pressure wave encounters the leadpipe's diameter and taper rate. These unwanted effects even exist, in conventional trumpets 100, when both the backbore taper and leadpipe taper are positive, resulting from differences in backbore diameter and leadpipe diameter. The discontinuities are labelled as "D" in FIG. 1B.

In the inventive trumpet, the discontinuity that would normally be created by the mouthpiece 411 joining the gap 414 and the gap 414 joining the leadpipe (i.e., leadpipe assembly) 416 is negated via a transition 415 in mouthpiece receiver 412. Additionally, the first and second diameter derivatives are the same on both ends of gap 414, resulting in the cancellation of the discontinuity from gap 414. Another method of eliminating such discontinuities, consistent with another embodiment of the present invention, would be to omit the transition 415 but have the diameter and taper rate of leadpipe 416 match that of the backbore 417 of mouthpiece 411. Gap 414 can then be virtually eliminated, but because of manufacturing tolerances, it is necessary to have a minimal gap.

For the trumpet 200 of the present invention, the transition 415 dimensions and the dimensions of the leadpipe 416 ensure a mathematically continuous inside-wall-shape, as further discussed below. In this manner, unwanted reflections are minimized or even removed because the pressure wave does not experience sudden changes of diameter or in the first or second derivatives when moving from the backbore 417 to the gap 414 and from gap 414 into the leadpipe 416 via transition 415.

One continuous mathematical shape that can be used to join the mouthpiece backbore and leadpipe without creating unwanted discontinuities is a transition using a power series. Specifically, the power series (i.e., $A+B^2+C^3+D^4+E^5+F^6+G^7+H^8$) is used to define the inside-wall-shape of transition 415. In practice, this is implemented by using tangent circular arcs between each two discrete points. Such a mathematically continuous inside-wall-shape thus removes discontinuities. Sample coefficients for the power series transition are shown below:

TABLE 1

| Transition Power Series Coefficients | |
|---|---|
| A | 0.1683 |
| B | 0.036 |
| C | 0 |
| D | 0 |
| E | 31.95312 |
| F | −426.3281 |
| G | 1883.594 |
| H | −2792.969 |

Figure 6:
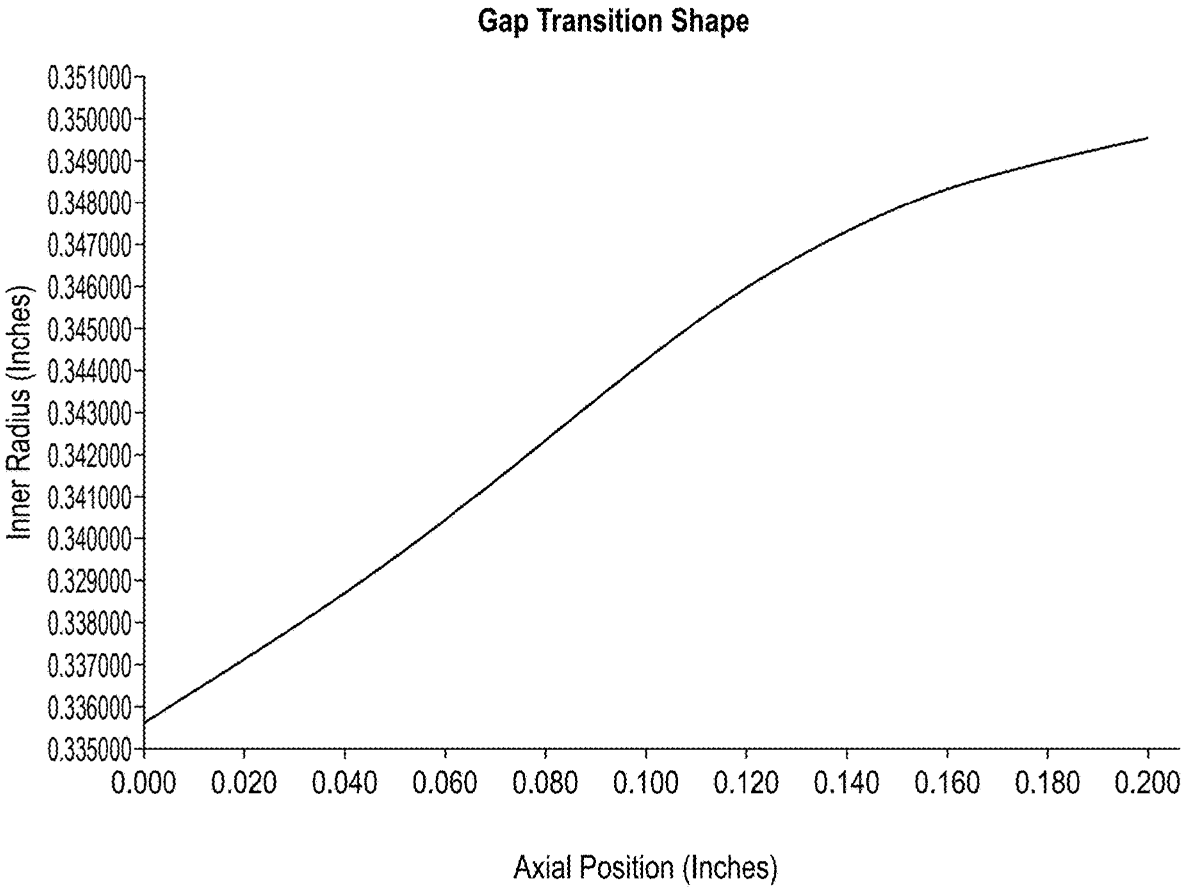
FIG. 6 is a graph of the transition to the leadpipe (i.e., leadpipe assembly) in accordance with embodiments of the present invention.

FIG. 6 plots this power series and demonstrates the transition shape between the mouthpiece backbore and the trumpet receiver.

Leadpipe

Figure 4A:
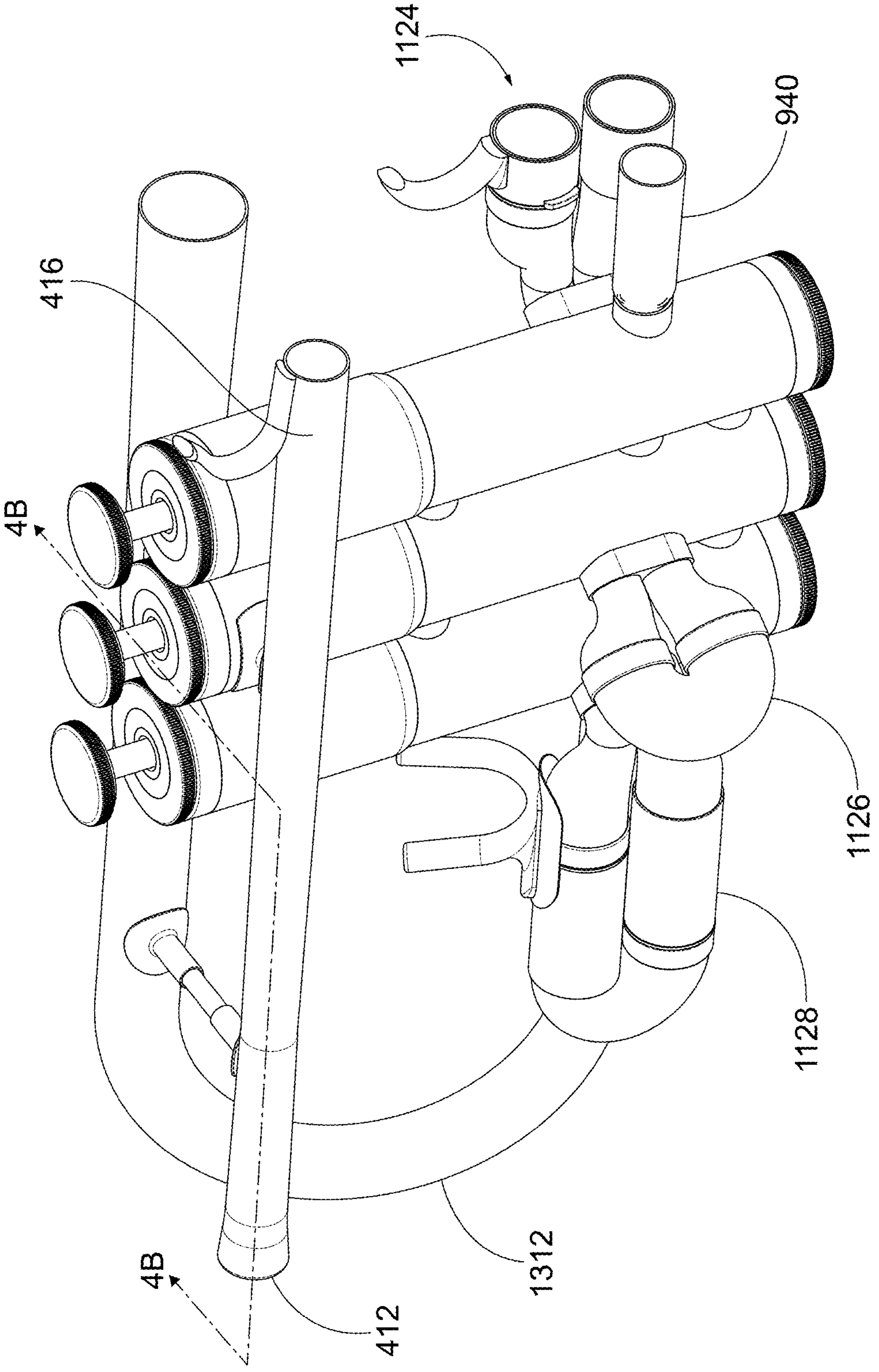
FIG. 4A is a top perspective view of a proximate portion of the trumpet illustrated in FIG. 2, including a mouthpiece/leadpipe assembly, a valve cluster assembly including first, second and third piston cylinder assemblies, and first and second valve slide assemblies.
Figure 7A:
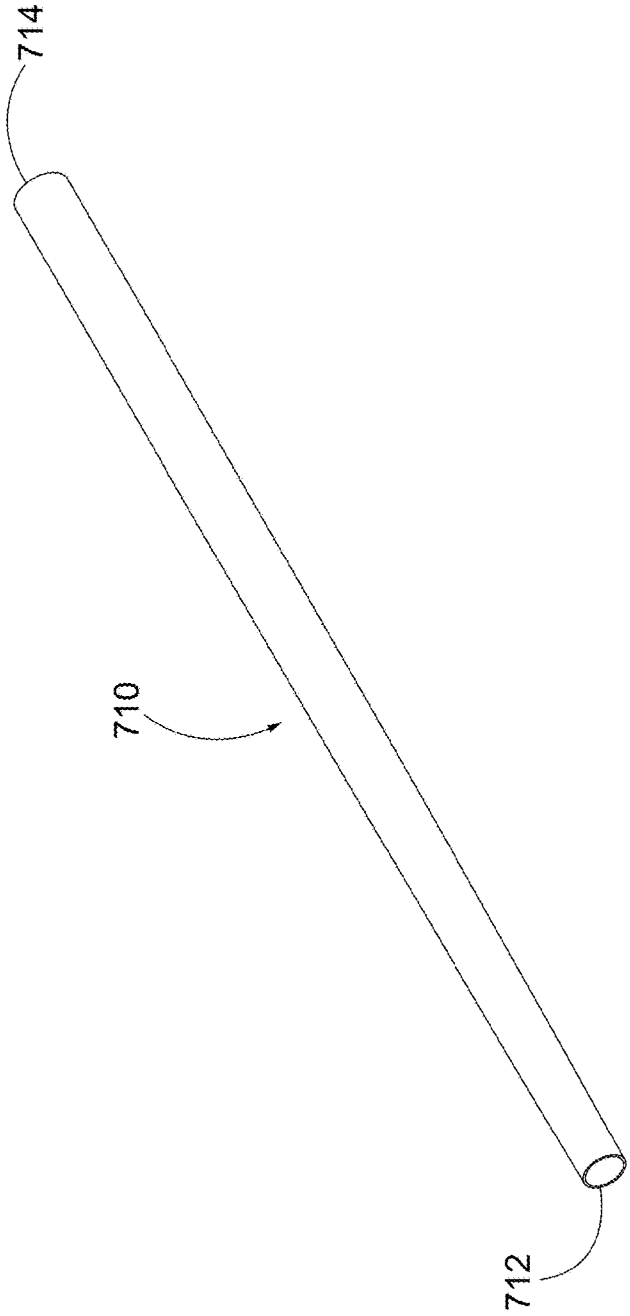
FIG. 7A is a top perspective view of the trumpet leadpipe illustrated in FIG. 2.
Figure 7B:
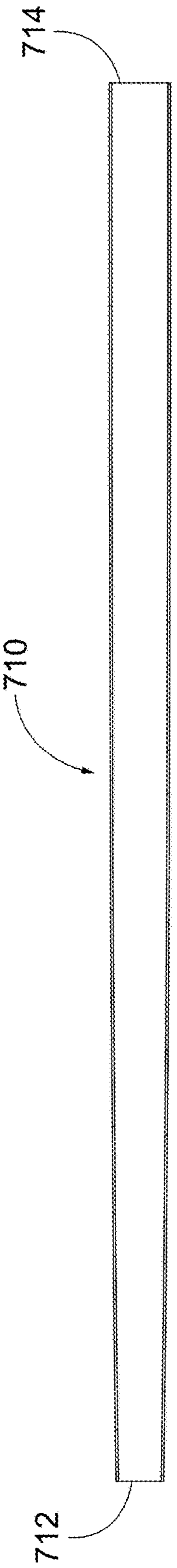
FIG. 7B is a side elevational view of the leadpipe of FIG. 7A.

FIGS. 7A and 7B show the general shape of the leadpipe 710, which has a narrow end 712 and wide end 714. Some conventional trumpets use a combination of a constant taper and a cylindrical cross-section for the leadpipe, wherein the cylindrical cross-sectional portion of such leadpipes follows the section with a constant taper. However, when the taper meets the cylindrical region, another discontinuity is created. For this reason, designs consistent with the present invention use a non-linear taper, thereby avoiding such a discontinuity. The taper is instead governed by a continuous mathematical function through the tapered (i.e., non-cylindrical) region 418 of the leadpipe 710 (see FIGS. 4A and 7A-7B).

Figure 4B:
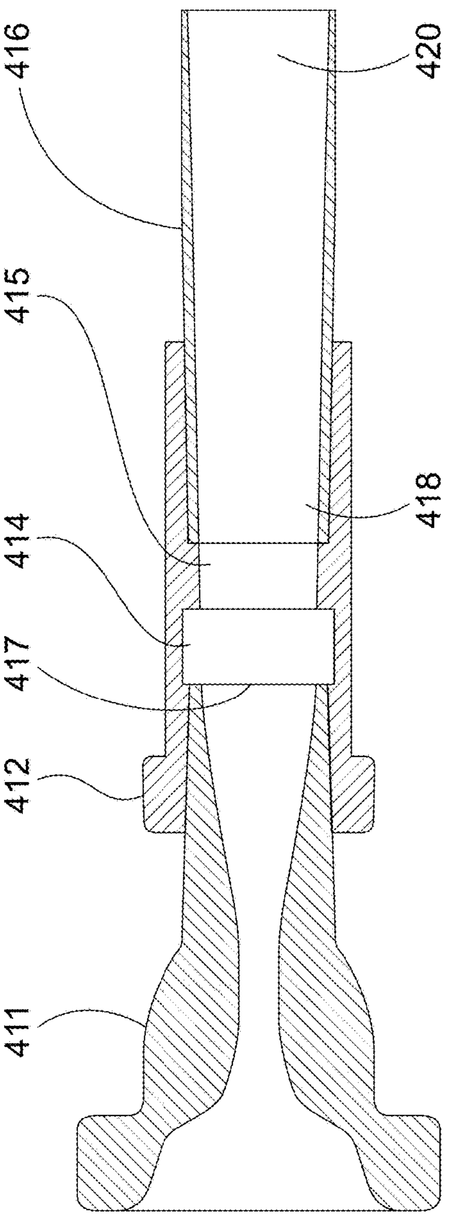
FIG. 4B is a cross-sectional view of the mouthpiece/leadpipe assembly of FIG. 4A, as taken along lines 4B-4B.
Figure 4C:
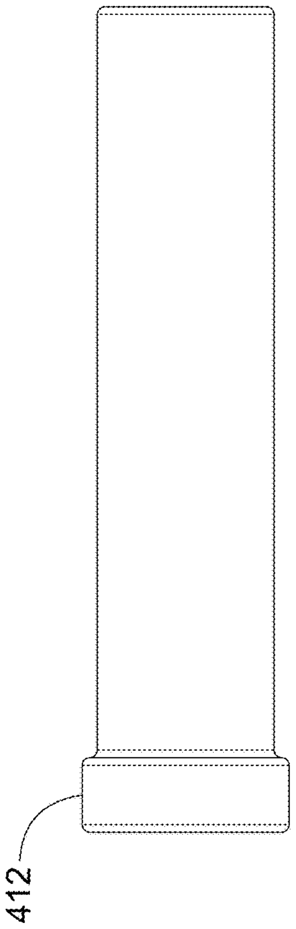
FIG. 4C is a side elevational view of the mouthpiece/leadpipe assembly of the trumpet of FIG. 4A.
Figure 4D:
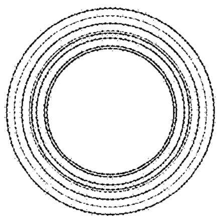
FIG. 4D is a cross-sectional view of the mouthpiece/leadpipe assembly of the trumpet of FIG. 4A.
Figure 8:
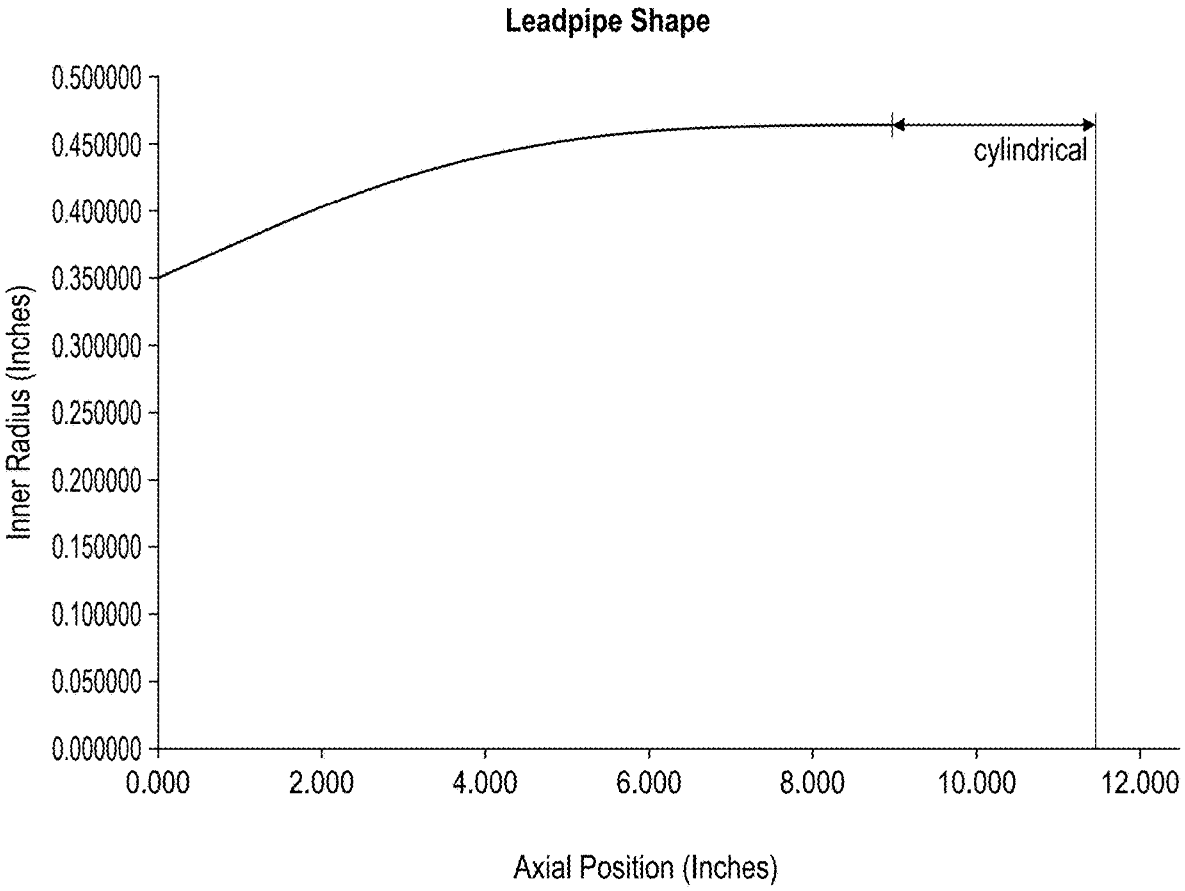
FIG. 8 is a graph of the trumpet leadpipe inside-wall-shape.

In an embodiment of the present invention, the transition 415 leads into the tapered region 418 of the leadpipe 710 (see FIG. 4B). This tapered region 418 eventually leads into a cylindrical region 420 of the leadpipe 416, which can be enveloped by a portion of the tuning slide 910 (see FIG. 9A). However, the tapered region 418 joining the cylindrical region 420 would normally create a discontinuity (e.g., in the conventional trumpet 100). Therefore, a second power series is employed to produce a mathematically continuous leadpipe inside-wall-shape. A graph of the tapered inside wall shape of the tapered region 418 of the leadpipe 710 is shown in FIG. 8. Sample power series coefficients leading to the taper in the sample embodiment of the present invention are shown below in Table 2.

The transition can be described by a series of coordinates. To achieve a mathematically continuous inside wall shape, such coordinates should be joined by tangent circular arcs. By definition, this results in a mathematically continuous wall shape.

FIG. 8 shows how the taper of the leadpipe varies, resulting in a wall shape represented by a power series with coefficients given in Table 2 below. Tangent circular arcs between coordinates ensure a mathematically continuous leadpipe inside-wall-shape.

TABLE 2

| Power Series Coefficients | |
|---|---|
| Transition From Tapered to | Cylindrical Power Series Coefficients |
| A | 0.175 |
| B | 0.013125 |
| C | 0 |
| D | 0 |
| E | −0.00007000000 |
| F | 0.00001286250 |
| G | −0.0000008750000 |
| H | 0.00000002125000 |

In a first embodiment, a leadpipe entrance diameter and an initial taper rate are selected which are independent of the mouthpiece backbore. A nonlinear, mathematically continuous taper is used as a transition from the leadpipe initial diameter and taper to a cylindrical shape over a desired leadpipe length. This embodiment has the advantage of being able to select a large initial diameter and a large initial taper rate, which produces a slightly darker sound and a lower blowing resistance. For such a leadpipe, a transition 415 is used prior to the separate leadpipe to get from the mouthpiece backbore exit diameter and taper rate to the leadpipe entrance diameter and taper rate without discontinuity. In such a design, any mouthpiece with the same backbore exit diameter and taper rate as the transition initial diameter and taper rate may be used without any discontinuity. The region 418 of leadpipe 416 is tapered, albeit at a different rate than the mouthpiece backbore, hence the need for a second discontinuity-free mathematical transitional shape. Unlike the large end 714 of the leadpipe, however, region 418 is, by definition, not cylindrical. As such, as discussed above, the taper of gap 414 and non-cylindrical region 418 should meet the criterion of constituting a mathematically continuous inside-wall-shape.

It should be noted that while the pictured trumpet has three sections: a first taper (i.e., region 415), a second taper (i.e., region 418) and a cylindrical region 420, in alternate embodiments, a two-segment approach (i.e., a gap directly into the leadpipe taper) may be utilized instead, and is consistent with the inventive trumpet design.

Specifically, in this embodiment, no significant gap length is used, other than about 0.010-inches, which allows the mouthpiece shank to contact the receiver under prevailing manufacturing tolerances, while considering some part wear. Instead, the leadpipe initial diameter and taper rate match those of the mouthpiece backbore to be used. In other words, the need for transition 415 is removed altogether. As a result of these adaptations, the sound is slightly brighter, and the blowing resistance is slightly higher.

Tuning Slide

Figure 9A:
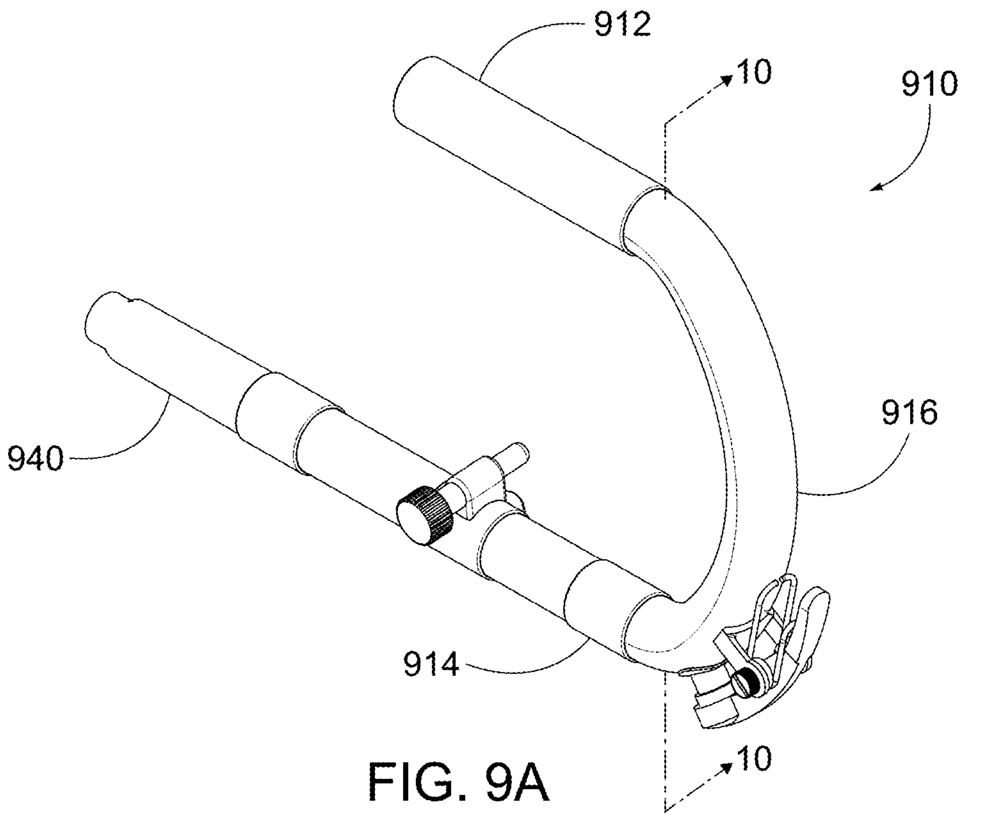
FIG. 9A is a top perspective view of the trumpet tuning slide assembly of the trumpet illustrated in FIG. 2.
Figure 9B:
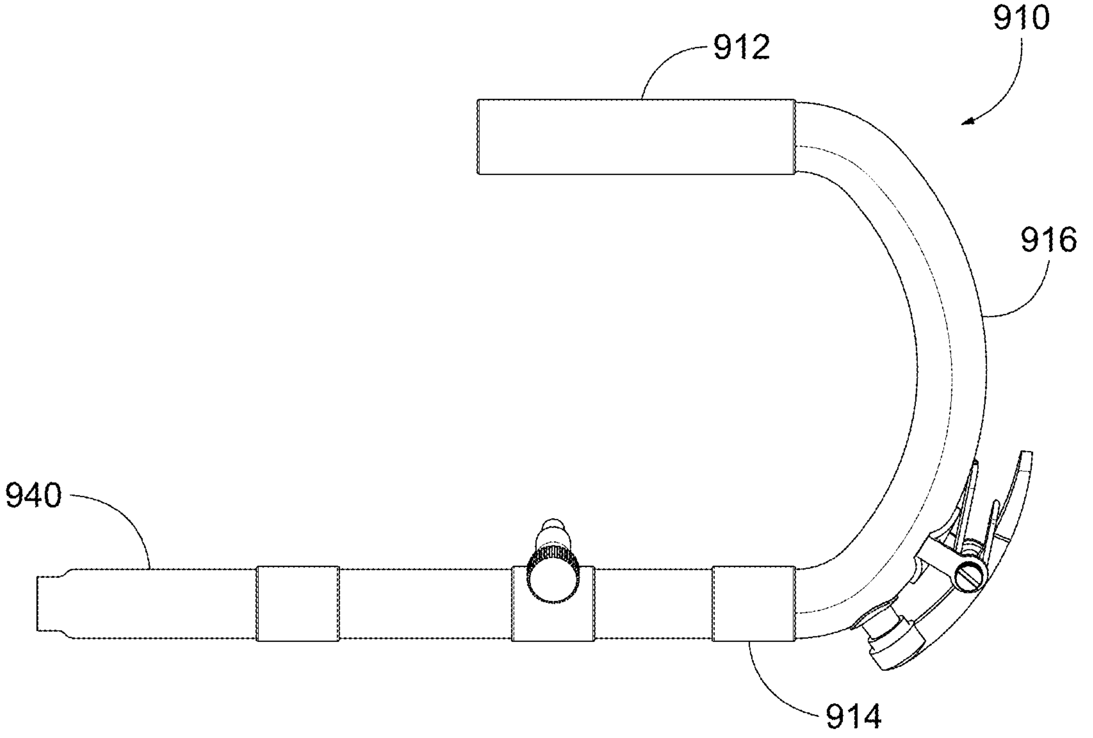
FIG. 9B is a side elevational view of the tuning slide assembly of FIG. 9A.

A modified tuning slide is now disclosed. FIGS. 9A and 9B show the tuning slide assembly 910. The tuning slide 910 enables the trumpet to be tuned to an initial tuning note, as in a symphony orchestra, and to make playing adjustments as required in the course of playing. An end 912 of the tuning slide 910 proximal the leadpipe 416 envelops the leadpipe 416 at the top end of the crook 916 (see FIGS. 2 and 3). Proximal end 912, there is upper leg 918A. At the bottom of the tuning slide assembly 910, an enveloping tube 914 receives a lower leg 918B (see FIGS. 9B and 10) of the tuning slide 910. Between these two legs 918A, 918B is the crook 916, which the trumpeter actuates to change the length of the trumpet's air column. The centerline 919 of the crook 916 is the shape of a circular arc centerline or a three tangent circular arc centerline. The former shape is used with most trumpets and has functioned adequately. However, an improved tuning slide will now be disclosed, consistent with the goals of the present invention.

Figure 10:
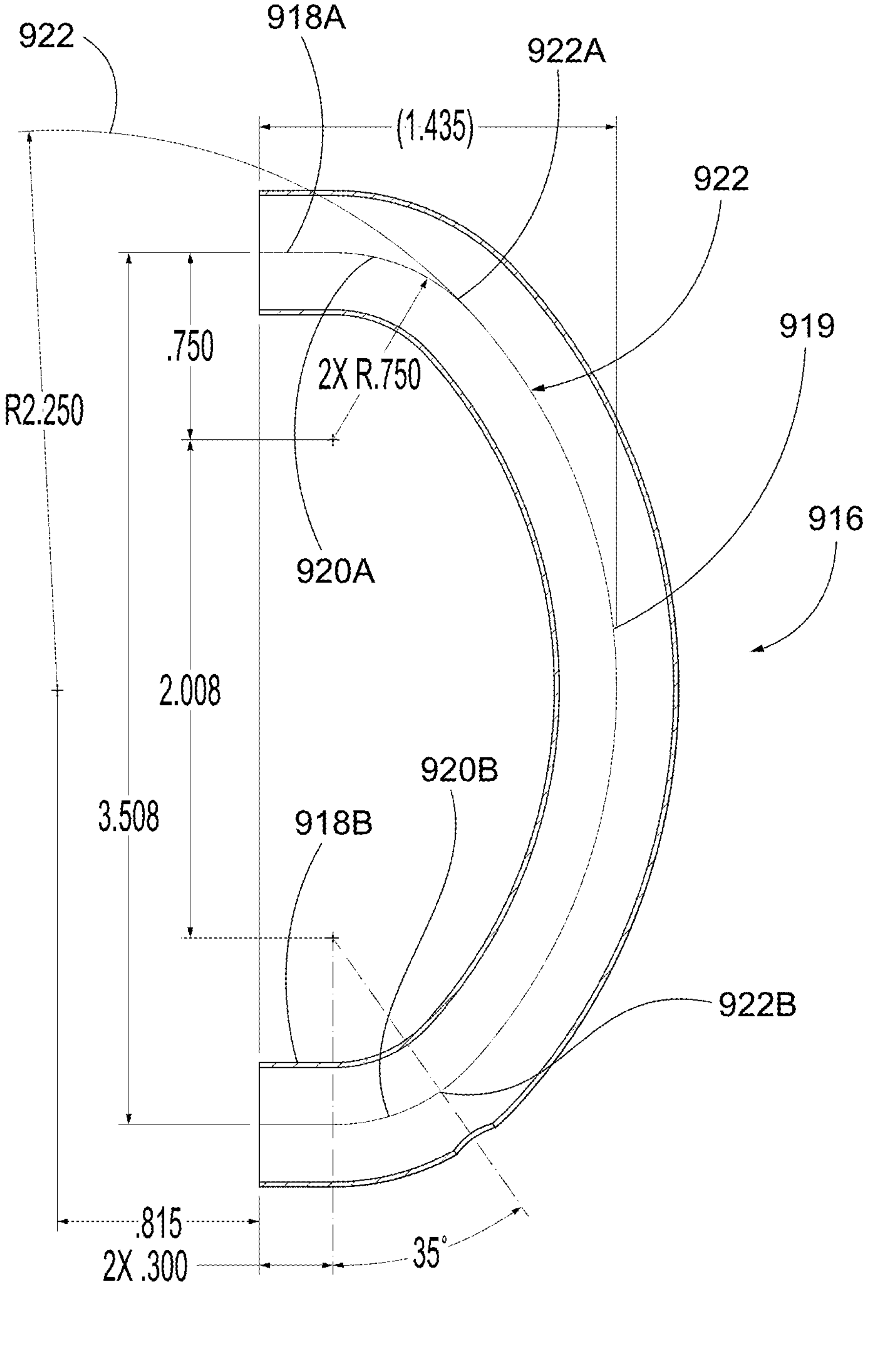
FIG. 10 is a partial sectional view of the crook of FIG. 9A, as taken along lines 10-10.

The modified crook 916 is constructed with three tangent circular arc centerlines. At both ends of the crook, there are cylindrical (i.e., not bent) legs 918A, 918B that can be, for instance, 0.3" in length. Two small radius bends 920A, 920B are positioned proximal the legs 918A, 918B at either end of the crook 916. Joining the two small radius bends 920A, 920B and forming the majority of the crook is a larger radius bend 922 defining the central portion of the crook 916, which is shown in the embodiment of FIG. 10 with a 2.250" bending radius. In FIG. 10, the two small radius bends 920A, 920B on either side of larger radius bend 922 are represented as 0.75" radius bends. The difference in bending radius between the two types of bend and between the legs 918A, 918B and small radius bends 920A, 920B would potentially create discontinuities resulting from the transition between two regions. To ensure that the introduction of discontinuities is avoided, both the small radius bends 920A, 920B and the larger radius bend 922 are tangent to the centerline 919. With this design, the first and second derivatives are the same approaching from the left and right at the points of transition 922A, 922B. In other words, the first small radius bend circular arc 920A's centerline is tangent to the large circular arc centerline 922, which is tangent to the second small radius bend circular arc 920B's centerline. With the provision of the carefully chosen tangent arcs for the small radius bends 920A, 920B, a premature reflection is created when the pressure wave encounters these shapes, which quickens the acoustic response of the trumpet 200 as a whole.

Valve Assembly Transition Pieces

Figure 11B:
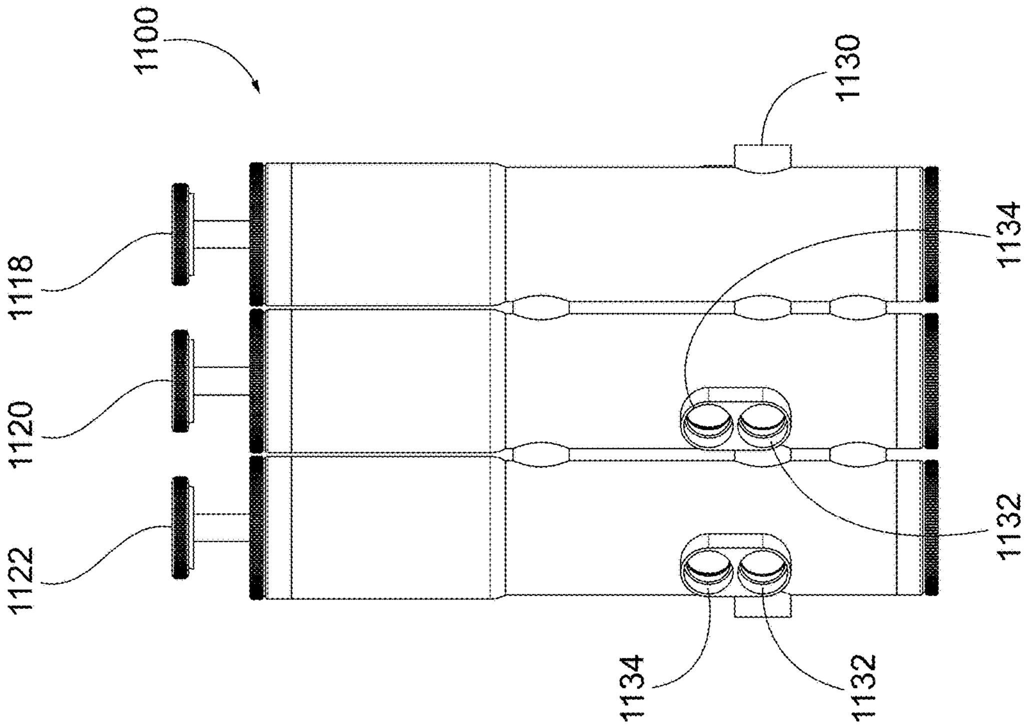
FIG. 11B is a front plan view of the valve cluster assembly of FIG. 11A.
Figure 11A:
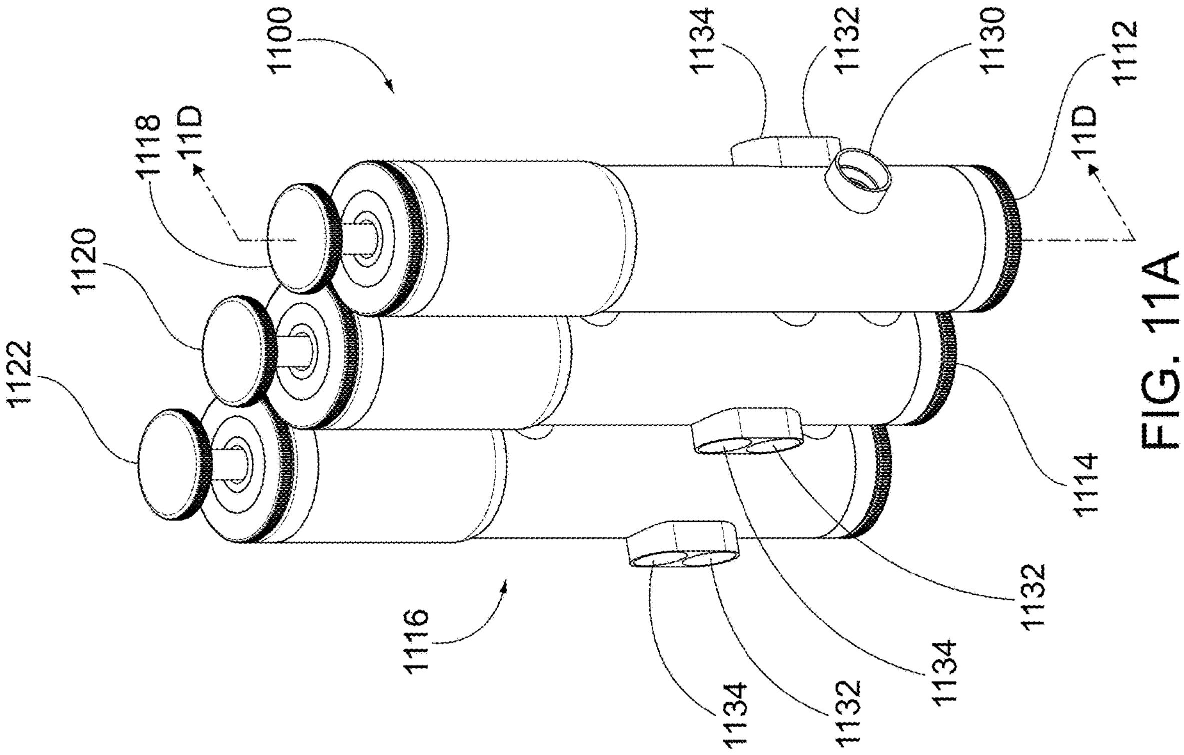
FIG. 11A is a top perspective view of the valve cluster assembly of the trumpet illustrated in FIG. 2.
Figure 11D:
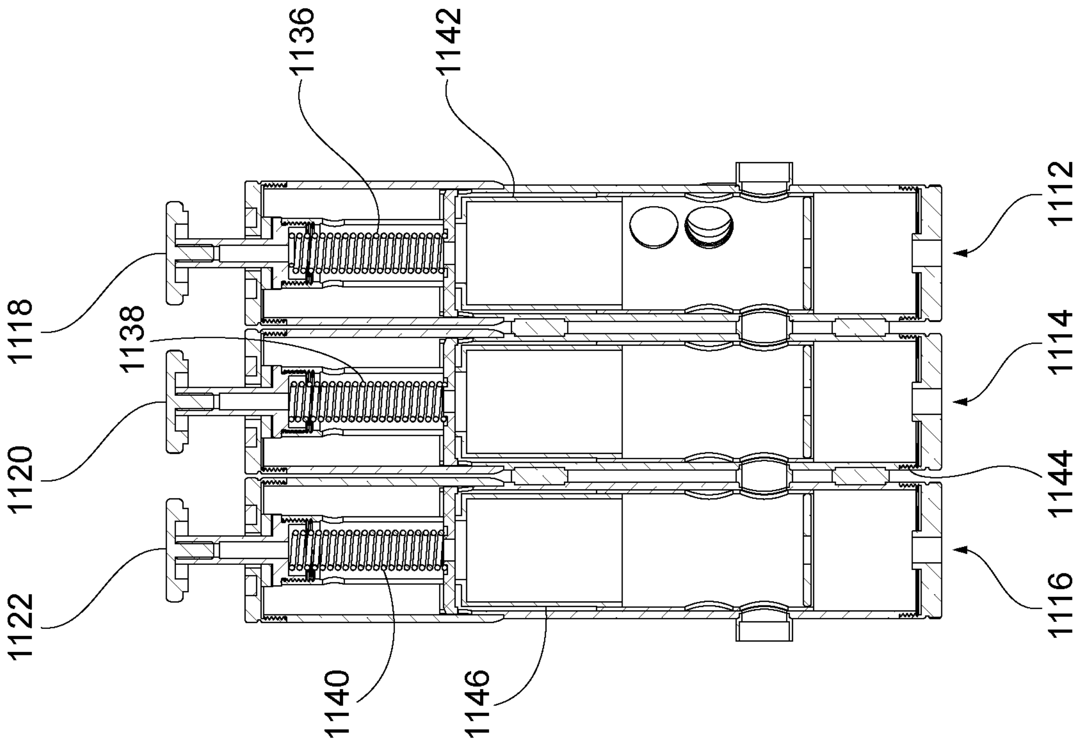
FIG. 11D is a cross-sectional view of the valve cluster assembly of FIG. 11A, as taken along lines 11D-11D.
Figure 11C:
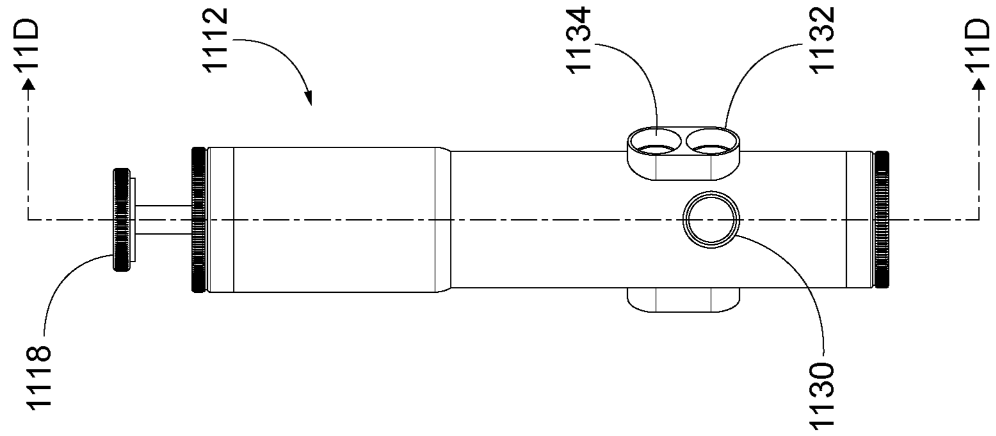
FIG. 11C is a right side view of the valve cluster assembly of FIG. 11A.
Figure 15A:
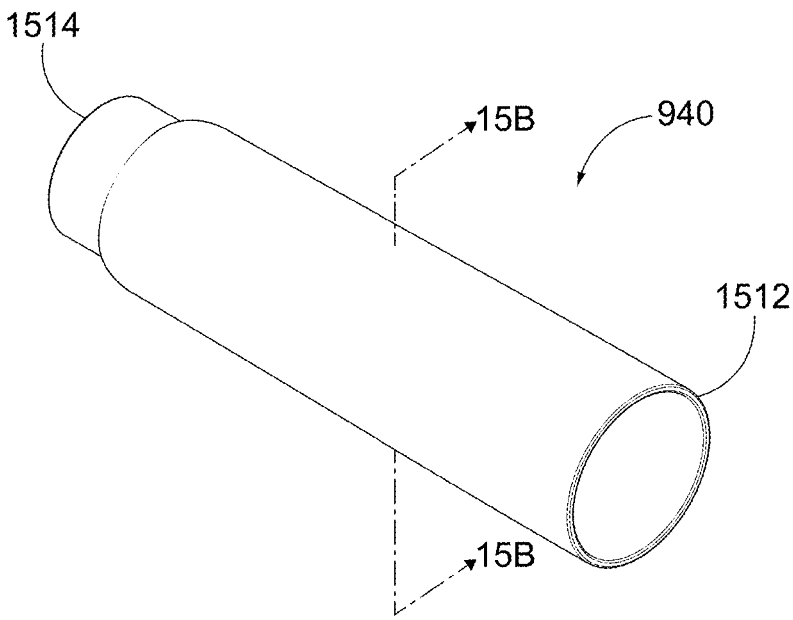
FIG. 15A is a top perspective view of a valve cluster transition illustrated in FIG. 2.
Figure 15B:
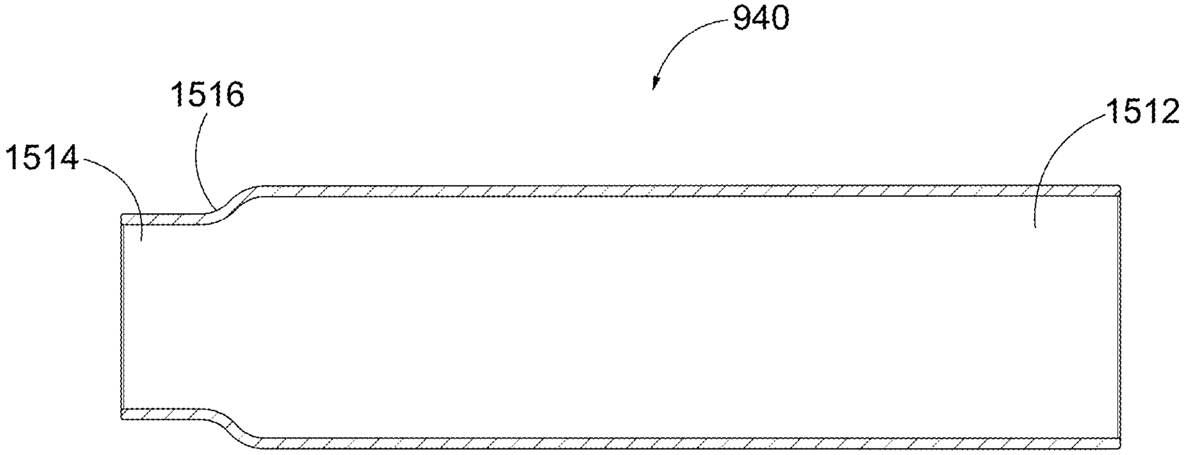
FIG. 15B is a cross-sectional view of the valve cluster transition of FIG. 15A, as taken along lines 15B-15B.

Preceding and following the valve assembly 1100 are valve cluster transitions 940 (see FIG. 9A and FIGS. 15A-B) that join the valve assembly 1100 (see FIG. 11A) to the rest of the trumpet 200. As with similar elements elsewhere in the inventive trumpet, a mathematical transition is employed to enable a change in diameter to and from the valve assembly 1100. For instance, a 0.6 inch diameter 1512 goes to a 0.3 inch diameter 1514 in entering the valve assembly 1100 and a 0.3 inch diameter 1514 goes to a 0.6 diameter 1512 in leaving valve assembly 1100 (see FIGS. 9A and 9B) These changes in diameter are accomplished by a pair of valve cluster transitions 940. Furthermore, discontinuities can be minimized by using two 0.79 inch tangent circular arcs 1516 to form the inside-wall-shape (see FIG. 15B) of valve cluster transitions 940. The smaller diameters 1514 of the valve cluster transitions 940 are proximal to the valve assembly 1100 on both sides. In other words, valve cluster transitions 940 are oriented symmetrically about valve assembly 1100. For the reasons discussed below, an embodiment of the present invention makes use a smaller bore size leading into the valve assembly 1100 and through each individual valve 1112, 1114, 1116.

Valve Assembly

In existing trumpets, the valve piston port diameter is the same as the instrument bore size, which is commonly 0.460-inch. There are three valve ports in each piston, one for the valve in the open position, one to divert the pressure wave to the valve slide, and one to divert the pressure wave from the valve slide back to the trumpet. The piston diameter is relatively small, so these three ports are curved in various directions, and the circular ports must be flattened slightly so the port tube exteriors can pass each other within the piston. As a result, the centerlines are not circular arcs and the cross-sectional shapes are not circular throughout, both of which create inside wall shape discontinuities.

A modified valve assembly 1100 has been designed for operation in conjunction with the rest of the inventive trumpet 200. As shown in FIGS. 2, 3 and 11A-11D, the valve assembly 1100 includes a first valve 1112, a second valve 1114, and a third valve 1116.

To avoid such discontinuities seen in the prior art, the valve pistons 1136, 1138, 1140 are made slightly larger, and the diameters of port tubes 1130, 1132, 1134 are decreased to 0.300-inches. It is for this reason that the valve cluster transitions 940 are used as described above. Shrinking the ports 1130, 1132, 1134 as such enables a design that can accommodate three ports with circular cross-sectional shapes in a given piston. However, because the valve port diameter is smaller, which results in increased blow resistance, in the present invention, the valve slide diameter is increased to compensate for this. To avoid a discontinuity caused by a diameter change, transitions comprising tangent circular arc centerlines and inside wall shapes are used. As a result, the valve slides 1124, 1126, 1128 are discontinuity-free, and the valve throw is reduced. The open valve port 1130 is straight, the valve port 1132 used to divert the pressure wave to the valve slide is a circular arc, and the valve port 1134 used to divert the pressure wave back to the piston comprises two tangent circular arcs. As a result, the centerline is either straight, a circular arc, or tangent circular arcs, and the cross-sectional shape is circular, and the valve ports are thus discontinuity-free.

Figure 12:
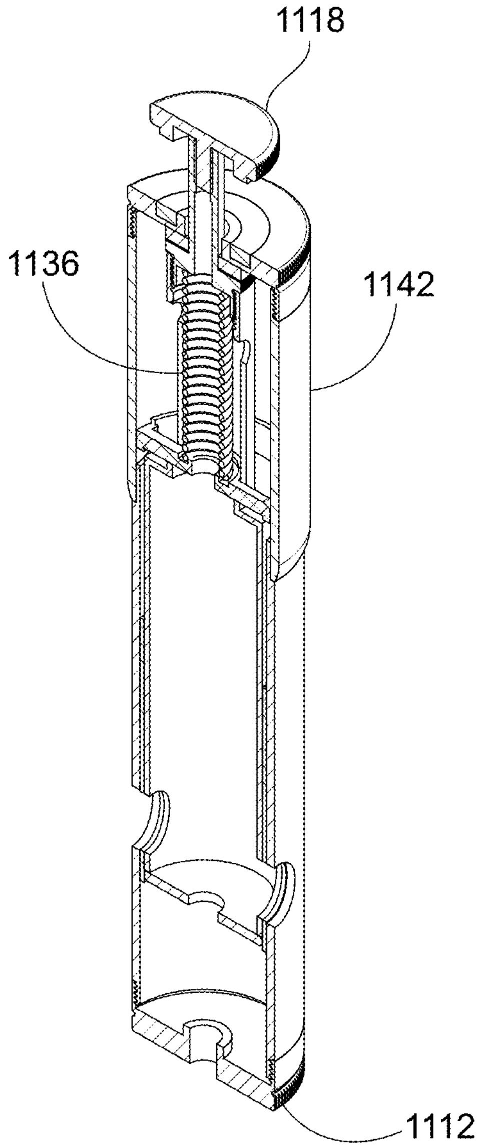
FIG. 12 is a sectional view of the first, second and third piston cylinder assemblies of the valve cluster assembly of FIG. 11A.
Figure 13A:
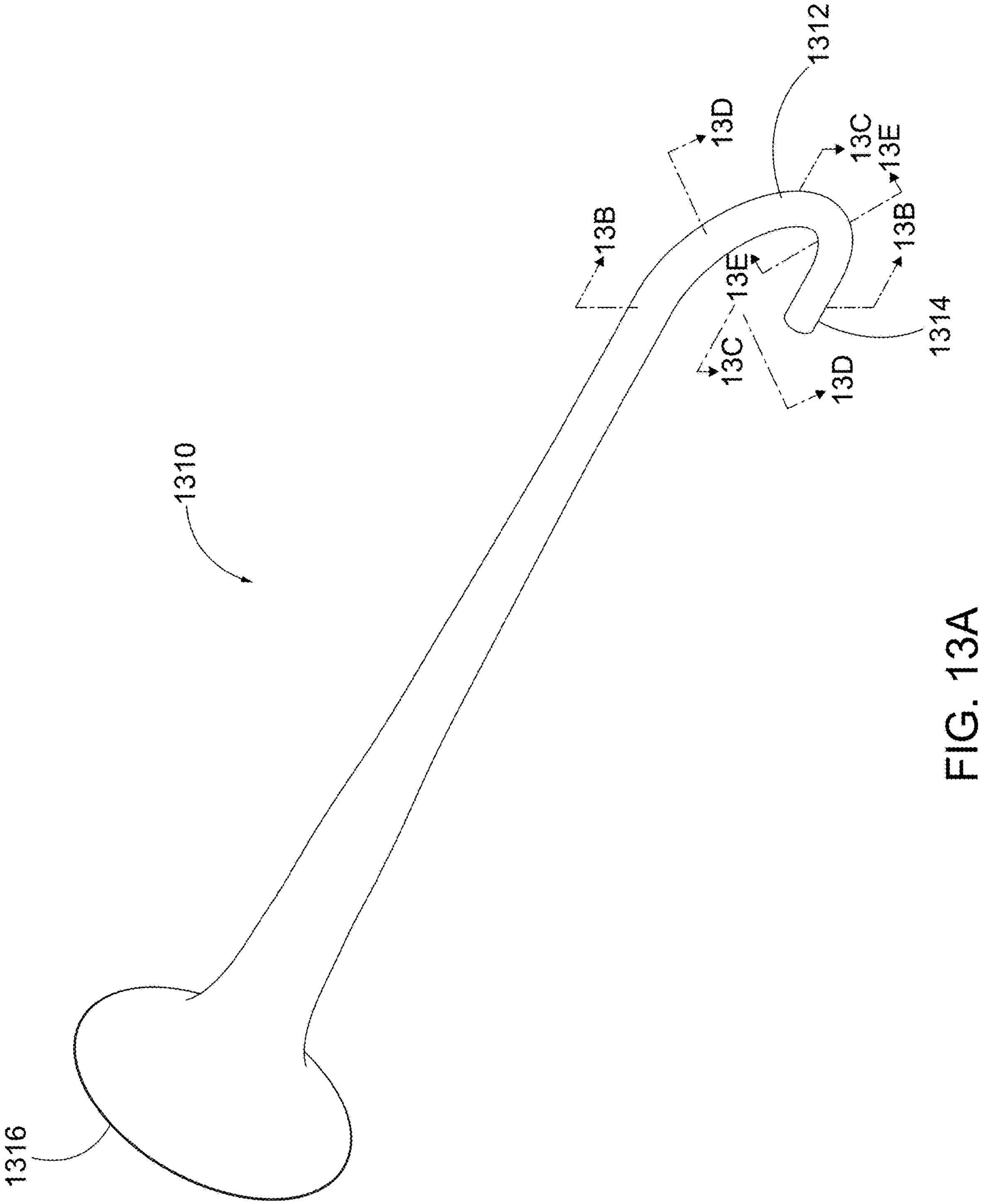
FIG. 13A is a top perspective view of the bell assembly of the trumpet illustrated in FIG. 2.
Figure 13C:
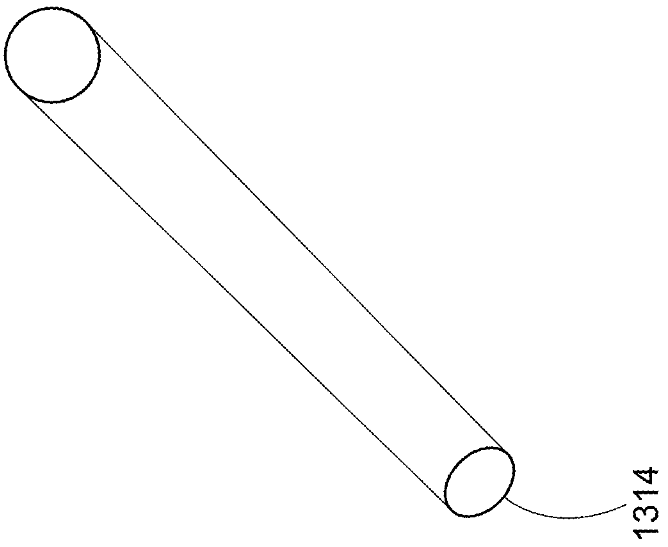
FIG. 13C is a cross-sectional view of another portion of the bell assembly of FIG. 13A, as taken along lines 13C-13C.
Figure 13B:
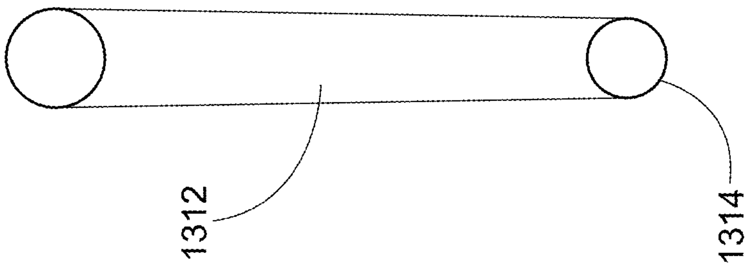
FIG. 13B is a cross-sectional view of a portion of the bell assembly of FIG. 13A, as taken along lines 13B-13B.
Figure 13E:
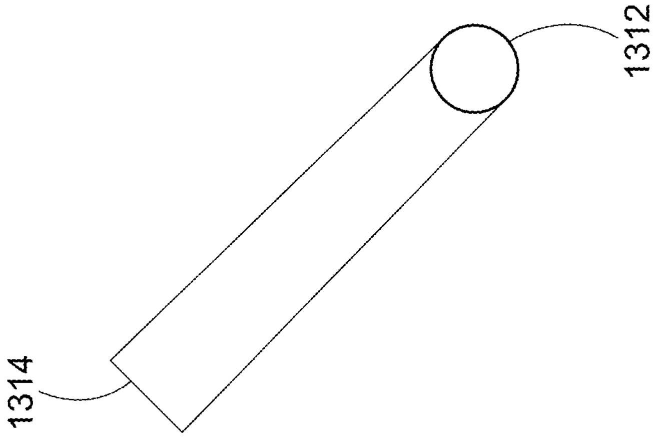
FIG. 13E is a cross-sectional view of still another portion of the bell assembly of FIG. 13A, as taken along lines 13E-13E.
Figure 13D:
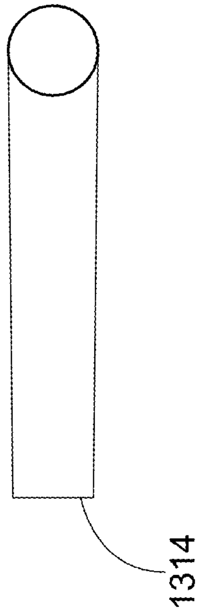
FIG. 13D is a cross-sectional view of a yet another portion of the bell assembly of FIG. 13A, as taken along lines 13D-13D.

The valves 1112, 1114, 1116 function in much the same manner as equivalent parts in conventional trumpets. Specifically, the principle of changing the path length to alter the pitch of the note played is well-understood. The first valve 1112, second valve 1114 and third valve 1116 are provided for changing the pitch of a played note (see FIGS. 11A, 11B, and 12), which redirect air to valve slides 1124, 1126, and 1128, respectively (see FIG. 3)

Using an equal temperament scale, combinations of the valves need to be able to play up to six semitones below that established by a trumpet resonance. Valve slides allow for the length of the trumpet to be changed, which changes the pitch. With this in mind, Table 3 calculates the required slide lengths for the first three semitones below resonance, corresponding to valves 1114, 1112 and 1116, respectively. For the sake of good order, it is noted that many trumpeters are accustomed to playing the third semitone by depressing valves 1 (i.e., 1112) and 2 (i.e., 1114) together, rather than using valve 3 (i.e., 1116) alone. Regardless, to play four, five or six (or even three) semitones below the trumpet resonance, multiple valves will be used, and the player must adjust the valve slide length when playing, as will be discussed in further detail below.

Conventional trumpets typically have a piston bore size of approximately 0.46 inches. Given that a typical piston diameter is approximately 0.88 inches, this amounts to a tight fit when needing to accommodate three different ports. As a result, while conventional trumpets may attempt to maintain a mostly circular cross-section, typically, the port cross-sectional shape in prior art trumpets is sacrificed for the ports to fit within the piston, and therefore the ports are not of strictly circular cross-section. As noted elsewhere in the present application, any deviation from a circular cross-section introduces discontinuities into the instrument as a whole. Increasing the piston sizes could overcome this challenge, but would space the buttons 1118, 1120, 1122 too far apart, requiring hand motion from the trumpeter, as opposed to offering a stable resting position from which he or she can access all three buttons. Therefore, the present invention utilizes slightly larger pistons 1136, 1138, 1140 for each of the valves to enable the piston ports 1130, 1132, 1134 to be circular in cross-section (see FIG. 11D) To partially compensate for this change, the space between valve cylinders (i.e., valve casings) 1142, 1144, 1146 is reduced, so there is minimal effect on the distance between the valve piston fingering pads 1118, 1120, 1122. In an embodiment of the present invention the buttons 1118, 1120, 1122 can also be resized as shown in FIGS. 11A-11D.

The valve assembly of the inventive trumpet was designed for a 55.85" trumpet total length (when none of the valves are pressed), as this length was found to meet the relevant design criteria. A trumpet should be able to play six semitones below those notes created using resonance 2 and 3, and such added lengths are shown in Table 3. For an even temperament scale the expression 2^(n/12) determines the ratio that the length must be adjusted to in order to achieve n semitones below the default pitch. Returning to Table 3 below, a choice of valve lengths is shown in order to achieve the semitones. With the use of valves 1112, 1114, 1116 individually accounted for, combinations of valves 1114 and 1116, 1112 and 1116, and 1112, 1114 and 1116 are used. However, when such combinations are used added slide length is needed, for which valve slides 1124 or 1128 may be used in conjunction with finger ring 1148 and saddle 1150, respectively. These elements function much the same as in a conventional trumpet. By actuating finger ring 1148 and/or saddle 1150, the slide length required in the far right column of Table 3 can be added to the default length of valve slides 1124 and/or 1128, respectively in order to hit the indicated notes.

TABLE 3

| N number of semitones reduced | 2^(n/12) | Bb Trumpet Normal Length " | Bb Trumpet Required Length " | Required Added Length " | Valve Number | Valve Added Length " | Valves Normally Used | Sum of Valve Lengths " | Slide Length Required " |
|---|---|---|---|---|---|---|---|---|---|
| 0 | 1.00000 | 55.85" | 55.8500 | 0 | N/A | N/A | N/A | N/A | N/A |
| 1 | 1.05946 | 55.85" | 59.1710 | 3.3210 | 2 | 3.3210 | 2 | 3.3210 | 0 |
| 2 | 1.12246 | 55.85" | 62.6895 | 6.8395 | 1 | 6.8395 | 1 | 6.8395 | 0 |
| 3 | 1.18921 | 55.85" | 66.4172 | 10.5672 | 3 | 10.5672 | 1 + 2 | 10.1605 | 0.4067 |
| 4 | 1.25992 | 55.85" | 70.3666 | 14.5166 | N/A | | 2 + 3 | 13.8882 | 0.6284 |
| 5 | 1.33484 | 55.85" | 74.5508 | 18.7008 | N/A | | 1 + 3 | 17.4067 | 1.2941 |
| 6 | 1.41421 | 55.85" | 78.9838 | 23.1338 | N/A | | 1 + 2 + 3 | 20.7277 | 2.4061 |

To avoid discontinuities, the ports 1130, 1132, 1134 and valve slides 1124, 1126 and 1128 maintain circular cross-sectional shapes. When a circular cross-sectional shape is maintained (as it is throughout inventive trumpet 200), the wall shape centerline can be composed of one or more tangent circular arcs, while still avoiding discontinuities (as shown in FIG. 10). Accordingly, the middle port 1132 for egress of the pressure wave into the valve slide has a tangent circular arc centerline. Meanwhile, the top port 1134 through which the pressure wave returns into the valve has a centerline composed of two tangent circular arcs. Port 1130 uses a straight centerline. Because the port sizes are decreased in this embodiment of the present invention, these three shapes of ports can all be accommodated in the still limited space afforded by the slightly larger pistons. And further to the end of feeling "natural" to a player, in an embodiment of the present invention, the pistons 1136, 1138, 1140 are spaced more closely together than in a conventional trumpet to offset the effects of enlarging the pistons.

Bell

The inventive bell shape of the trumpet 200 is now described with reference to FIGS. 13A-13E. Discontinuities exist in many trumpet designs that are caused by the tail bend 122. The small end of existing trumpet bells is bent around a circular shape to form the tail bend 122. The existing bell small end discontinuity remains; however, a further discontinuity is created because the curved bell centerline is not circular. In the present invention, such a tail bend 1312 is made by retaining the bell outside wall shape within a pair of milled rollers in a special bending device, which produces a circular arc centerline. The 180-degree circular arc that is used for the trumpet bell tail bend 1312 of the trumpet 200 of the present invention avoids introduction of any discontinuities in tail bend 1312.

In conventional trumpets, the most popular bell shape has been that of the Bessel horn. Discovered by chance centuries ago, the performance of this shape has been serviceable, and designs by Bach and Benge emulated the French Besson design. The Bessel horn shape is given by the formula r=K/(x+b)^m, a hyperbolic function.

However, while the simple mathematical function defining the Bessel horn inner wall shape appears smooth unto itself, when the hyperbolic Bessel horn shape is joined to a cylindrical tubing leading into the stem, a discontinuity is formed. Moreover, the hyperbolic Bessel horn shape is joined to cylindrical tubing leading into stem 1314. As such, a discontinuity is formed. In the present invention, the discontinuities are eliminated by modifying the Bessel horn small end shape using equations [1]-[5].

Much like elsewhere in the inventive trumpet, the shape transition is used to account for the change in tube diameter. Specifically, to provide a mathematically continuous inside wall shape, the modified Bessel horn function was developed (see equation 1). The modified function is applied to the entirety of the stem 1314 to make the inside wall shape of bell 1310 mathematically continuous throughout to and to eliminate the discontinuity resulting from joining a hyberbolic inside-wall-shape to a cylindrical inside-wall-shape shape.

A modified Bessel horn equation is as follows:

$$r = \frac{K}{(x+b)^m} - A\sin\left(\frac{X}{L}\pi\right)\sin\left(\frac{x}{L}\frac{\pi}{2}\right) - B\sin\left(\frac{L-x}{L}\pi\right)\sin\left(\frac{L-x}{L}\frac{\pi}{2}\right) \quad (1)$$

Where r is the bell radius as a function of axial coordinate x (oriented from the large end and increasing when approaching the small end). The length of the bell is L. A, B, m and K. are constants determined by the equations below. Various constants are derived from equations 2-5 below.

$$m = \frac{\ln\left(\frac{r_l}{r_s}\right)}{\ln\left(\frac{L}{b}+1\right)} \quad (2)$$

$$K = r_l b^m \quad (3)$$

$$A = \frac{L}{\pi} * \frac{mK}{(L+b)^{m+1}} \quad (4)$$

$$B = \left(\frac{L}{\pi}\right)^2 \frac{m(m+1)K}{(L+b)^{m+2}} \quad (5)$$

Where $r_l$ is the large end bell radius, and $r_s$ is the small end bell radius. With the values of A and B determined by the equations above, the first and second derivative of the bell radius at the small end are equal to zero.

Nonetheless, such a corrected bell shape does not produce the desired harmonically related resonances. Instead, this is done by making two further sets of bell shape modifications, both of which maintain the discontinuity-free shape. As such, another design goal of the present invention is the achievement of near perfect harmonicity in the bell shape, which will serve to produce, with the use of valves, a perfect three and a half octave chromatic scale and increased ease of playing into the highest playing register. Resonances 2 through 16 are used to produce the fundamental tones over a three-octave playing range.

To achieve this, carefully chosen perturbations are also used in addition to the initial improved Bessel horn stem shape correction given by equations [1]-[5].

A perturbation function is embodied in Equation 6 below, wherein 1 is the length, measured from the bell rim towards the bell stem, for which the perturbation affects the inside wall shape. Generally speaking, longer perturbation lengths affect primarily the lower resonance modes, while shorter perturbation lengths mainly affect higher resonance modes.

For small coefficients, it is assumed that perturbations of the resonances are linear, symmetrical and cumulative. A general method for arriving at the perturbation functions is now described. Starting with the modified Bessel horn function and a set of arbitrary perturbation lengths and coefficients, an air-column simulation is used to determine a set of corrected perturbation coefficients that partially correct resonances 2 through 14. From there, an iterative process is used to correct the perturbations via increasingly small adjustments to the coefficients. As this process continues, the predictive computer simulations become more accurate and the deviations from harmonicity become increasingly small until they are near zero for all of resonances 2 through 16. These perturbation functions are all added to the modified Bessel horn equations to further refine the trumpet bell inside wall shape. Because the coefficients of these functions are so small, the effectiveness of the stem transition joining the hyperbolic Bessel horn shape with the cylindrical shape of the tubing preceding the bell is largely unaffected, while gaining the property of near-perfect harmonicity.

As such, the series of perturbation functions are applied to the modified inside wall shape given by the modified Bessel horn equation. There are fifteen perturbations functions, corresponding to resonances two through sixteen. Each perturbation function is only applied to a certain depth of the bell (i.e., measured from rim 1316 towards the stem 1314). The perturbation function for the second harmonic extends the deepest, while those corresponding to each successive resonance frequency is applied to increasingly shallow depths down the bell. With these corrections, resonances two through sixteen are harmonically related. This effectively establishes a three-octave playing range. And with the provision of the valves, this can be further expanded to a three and a half octave range. Overall, fifteen perturbations are used to produce near perfect harmonicity in the second through sixteenth resonances: one for each resonance. The result of these perturbations are resonances that are near pitch-perfect.

Equation 6 below is used to define the bell shape perturbations. Ln is the length for which a given perturbation is applied. X is the axial position where x=0 is the large end of the bell. Cn is the perturbation coefficient. The total perturbation function is achieved via adding all of the individual perturbation functions together, which are then applied to the inside wall shape for the entire bell, in addition to the modified Bessel horn shape.

$$r=\sum_{n=1}^{p} C_n \sin\left(\pi\left(\frac{l_n-x}{l_n}\right)\right)\sin\left(\frac{\pi}{2}\left(\frac{l_n-x}{l_n}\right)\right) \tag{6}$$

The coefficients can be determined by iterative computational methods. Sample values for the coefficients are found in the table below. The longer perturbations correct the lower resonances, and the shorter perturbations correct the higher resonances.

TABLE 4

| Perturbation Constants | |
|---|---|
| Perturbation Length In | Perturbation Coefficient Cn |
| 23.90 | 0.03088 |
| 17.70 | 0.00979 |
| 13.80 | 0.02105 |
| 10.75 | −0.03935 |
| 8.75 | 0.13780 |
| 7.20 | −0.04700 |
| 6.75 | −0.01000 |
| 6.35 | −0.04600 |
| 5.50 | −0.06800 |
| 5.25 | 0.01900 |
| 4.65 | 0.05000 |
| 4.40 | 0.01000 |
| 4.00 | 0.01000 |
| 3.75 | −0.11000 |

Further details on an exemplary procedure to arrive at the perturbation coefficients can be found in the publication entitled "Trumpet with Near-perfect Harmonicity: Design and Acoustic Results," which is attached hereto as Appendix A and incorporated by reference and made a part of the present application where applicable. Essentially, this paper explains how the air column response is modeled using computer software to arrive at coefficients, in a similar manner by which the values of Table 4 are obtained.

The perturbations correct resonances 2-16, which establishes the fundamental properties of pitch. While the corrections above affect the resonances and enable notes to be played in tune, each tone has about twenty-five harmonics, which are multiples of the fundamental frequency. While the pitch would be accurate without further correction, the harmonics establish the timbre of the instrument. The effects of imperfect harmonics can be felt by the trumpeter in the form of acoustic resistance, which makes the instrument as a whole more difficult to play. Therefore, the flare of the bell is also corrected for better harmonicity. To this end, a flare correction function has been developed to apply to the modified Bessel horn in addition to the applied perturbation functions.

The bell flare inside-wall-shape correction is defined by a power series. Specifically, its dimensions are defined as a power series of nine terms, and the frequencies for resonances greater than 16 are corrected by using a bell flare inside wall shape given by the power series:

$$r=A+Bx+Cx\hat{}2+Dx\hat{}3+Ex\hat{}4+Fx\hat{}5+Gx\hat{}6+Hx\hat{}7+Ix\hat{}8$$

TABLE 5

| Flare Shape Correction Power Series Coefficients | |
|---|---|
| A | 2.311811 |
| B | −1.959089 |
| C | 1.1386000 |
| D | −0.4751720 |
| E | 0.1624451 |
| F | −0.0445248 |
| G | 0.0091491 |
| H | −0.001244296 |
| I | 0.000080486 |

In other words, all resonances are in perfect or near perfect tune (i.e., they are multiples of each other). And thus, the resonances are harmonically related as a result of this adjustment function. The power series equation above further affects the modified Bessel horn shape, commencing 2.60-inches from the bell's large end. It should also be noted that the rim 1316 follows these mathematical functions and should be considered an extension of and part of the bell.

While the above discussion relates to acoustic properties of the trumpet, the present invention should also be understood to encompass improvements to a trumpet's vibrational properties as well. In the present invention, the bell is formed by spinning an annealed, machined hollow blank, the inside diameter of which matches a portion of the bell mandrel. The blank wall thickness is prescribed, so when the completed bell is spun to a prescribed wall thickness, the bell metal is work-hardened to a fully hard temper. This produces the best possible bell vibration response.

Figure 14A:
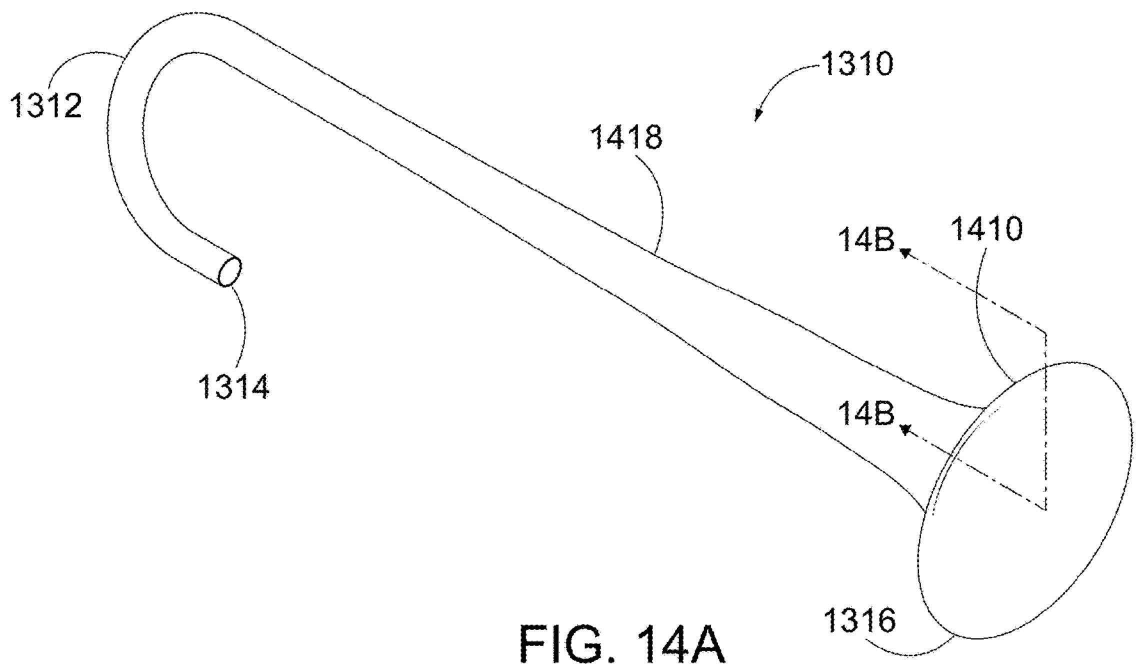
FIG. 14A is another top perspective view of the bell assembly of the trumpet illustrated in FIG. 2.
Figure 14B:
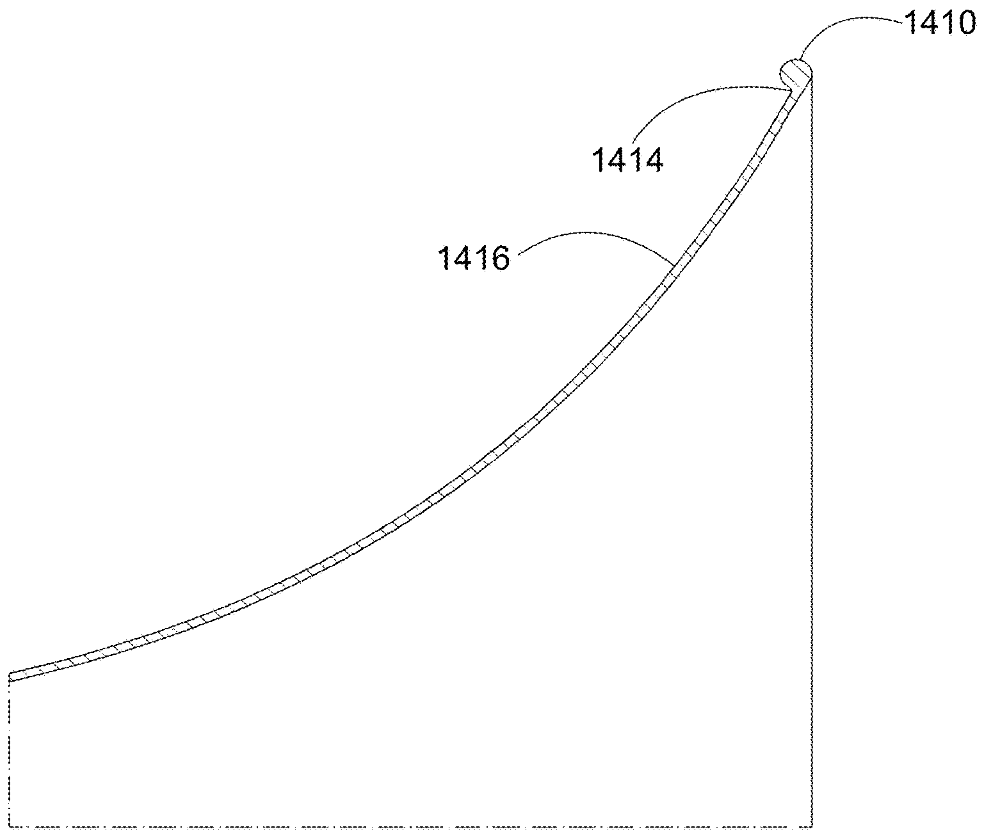
FIG. 14B is a partial cross-sectional view of a portion of the bell assembly of FIG. 14A, as taken along lines 14B-14B, and showing the bell bead of the bell assembly.

An embodiment of the present invention relates to an improvement to the trumpet's bell bead, as illustrated in FIGS. 14A and 14B. The bead 1410 (see FIG. 14B) of the trumpet's bell is a raised edge on the rim of the bell rim 1316.

The lower portion of the circular cross-section bell bead is formed by the bell mandrel, and the upper portion of the bell bead is formed by spinning a varying wall thickness, and as a result, the bell bead is an integral portion of the bell. This has advantages over existing trumpets, wherein the bell bead is typically formed by rolling some of the thin bell wall around a separate small diameter bell wire. The disadvantage of such a construction is the contacts between the bell wall and the bell wire and the bell wire ends cannot be assured. Rather, the bell bead joint is usually soldered in an attempt to assure the desired contact. Moreover, such a method can result in less than perfect contact between the bell wall and the bell wire and in between the bell wire ends, and solder introduces another metal into the bell, which is undesirable. Such a gap resulting from this method, adversely affects the sound of the trumpet, especially, if the bead is made of a different material than the rest of the trumpet. Typical bell beads that are made from wire, solder, or other material that is different from that of the rest of the bell are generally deleterious to the sound produced. As such, a bell bead formed as an integral part of the bell is proposed for the present invention, made from the same material as the rest of the bell.

In order to address this traditional problem in conventional trumpets, a method of spinning a bell with a contiguous bell bead and made from the same material has been developed. A CNC spinning machine is used to form a bell with an integral bell bead. The bell mandrel is defined by a large number of coordinates which are connected by tangent circular arcs to form a mathematically continuous bell inside-wall-shape.

In addition to the bead manufacturing method avoiding soldering or bell wire methods, the metal has a fully hard temper and is thin, allowing the bell wall to vibrate at the highest amplitude possible. This means that the bell is optimally vibrationally responsive for harmonically-related resonances 2-16. Since the bead 1410 is not a discrete piece, there is no gap when the bell bead is formed as an integral part of the bell 1310. The bead 1410 is circular in cross-section, with a thickness typically in the range of 80 to 100 thousandths of an inch when added to the wall thickness 1416 near rim 1316. Typical bell material thicknesses are approximately fifteen thousandths of an inch. To this end, there is a small transition region between the normal wall thickness and the raised bead. This is in the form of a fillet radius 1414 that leads into the bell-bead 1410. The sum of the fillet radius 1414 and wall thicknesses of wall 1416 equals the radius of the bell bead. As such, the fillet radius 1414 becomes progressively thicker as it approaches the bead 1410.

In an embodiment of the present invention, the wall thickness 1416 proximal the bead is fifteenth thousandths of an inch. For instance, the wall thickness near the middle portion 1418 of the bell is twenty thousandths of an inch, and there is a taper between the two different wall thicknesses 1416, 1418. The integral bell bead 1410 described herein stabilizes the bell 1310 overall and causes the bell flare to exhibit many well-defined vibrational modes, which resonate at the bell resonance frequencies.

It will be understood that the embodiments described herein and in Appendix A are merely exemplary and that a person skilled in the art may make many variations and modifications without departing from the spirit and scope of the invention. All such variations and modifications are intended to be included within the scope of the invention.

The invention claimed is:

1. A trumpet, comprising:

a receiver assembly;

a leadpipe assembly coupled to said receiver assembly;

a tuning slide assembly coupled to said leadpipe assembly;

a valve cluster assembly;

a bell assembly including a stem, a bend and a rim;

transition elements having respective wide ends and respective narrow ends and joining said bell assembly to said valve cluster assembly and joining said valve cluster assembly to said tuning slide assembly;

wherein said receiver assembly has means for receiving a mouthpiece at a proximal end of said receiver assembly, and wherein said receiver assembly is configured to receive said leadpipe assembly at a distal end of said receiver assembly;

wherein said receiver assembly includes a transition region configured to eliminate mathematical discontinuities in said receiver assembly;

wherein said leadpipe assembly includes a region with a tapered radius, proximal said receiver assembly, and a region with a constant radius proximal said tuning slide assembly;

wherein said tuning slide assembly comprises a proximal end configured to envelop said leadpipe assembly, and a distal end configured to be enveloped by piping leading into one of said transition elements;

wherein said tuning slide assembly comprises a crook with a circular cross-sectional shape and a centerline comprising three tangent circular arcs in succession;

wherein said transition elements include walls having wall shapes that includes two tangent circular arcs joining said respective wide ends to said respective narrow ends;

wherein a first transition element and a second transition element connect to said valve cluster assembly at said respective narrow ends of said transition elements;

wherein said valve cluster assembly includes a first valve comprising a first piston and cylinder arrangement, a first valve slide, and a first button configured to operate said first valve, wherein said first valve comprises a first circular cross-sectional port having a straight centerline, a second circular cross-sectional port having a circular arc centerline and leading into said first valve slide at a first end of said first valve slide, and a third circular cross-sectional port having a centerline composed of multiple tangent circular arcs and coupled to the other end of said first valve slide;

wherein said valve cluster assembly includes a second valve comprising a second piston and cylinder arrangement, a second valve slide, and a second button configured to operate said second valve, wherein said second valve comprises a fourth circular cross-sectional port having a straight centerline, a fifth circular cross-sectional port having a circular arc centerline and leading into said second valve slide at a first end of said second valve slide, and a sixth circular cross-sectional port having a centerline composed of multiple tangent circular arcs and coupled to the other end of said second valve slide;

wherein said valve cluster assembly includes a third valve comprising a third piston and cylinder arrangement, a third valve slide, and a third button configured to operate said third valve, wherein said third valve comprises a seventh circular cross-sectional port having a straight centerline, an eighth circular cross-sectional port having a circular arc centerline and leading into said third valve slide at a first end of said third valve slide, and a ninth circular cross-sectional port having a centerline composed of multiple tangent circular arcs and coupled to the other end of said third valve slide;

wherein said first valve slide has a length chosen to lower the default pitch of the trumpet by two semitones when said first button is pressed;

wherein said second valve slide has a length chosen to lower the default pitch of the trumpet by one semitone when said second button is pressed;

wherein said bend has a circular arc inside wall shape;

wherein said bell assembly has a modified Bessel horn shape;

wherein said bell assembly includes a plurality of perturbations applied to the inside wall shape thereof and configured to correct second through sixteenth resonances of said trumpet;

wherein said bell assembly includes a flare shape correction configured to correct the harmonics of said trumpet;

wherein said rim comprises a raised bell bead and a fillet radius leading into said bell bead, said bell bead being contiguous with the rest of said bell assembly.

2. The trumpet of claim 1, wherein said trumpet has a circular cross-section throughout its entirety.

3. The trumpet of claim 2, wherein said trumpet has a centerline throughout that consists of straight lines, circular arcs and tangent circular arcs.

4. The trumpet of claim 1, wherein said transition region has an initial taper rate and diameter matching a backbore of the mouthpiece.

5. The trumpet of claim 1, wherein said means for receiving a mouthpiece includes an opening at said proximal end of said receiver assembly.

6. The trumpet of claim 1, wherein said transition region is minimal in length.

7. The trumpet of claim 1, wherein said third valve slide has a length chosen to lower the default pitch of the trumpet by three semitones when said third button is pressed.

8. The trumpet of claim 1, wherein said bell bead is made of the same material as the rest of said bell.

9. The trumpet of claim 1, wherein said respective wide ends of said transition elements have diameters of approximately 0.6 inches.

10. The trumpet of claim 1, wherein said respective narrow ends of said transition elements have diameters of approximately 0.3 inches.

11. The trumpet of claim 1, wherein said three tangent circular arcs include a first small radius tangent circular arc, a large radius tangent circular arc tangent to said first small radius tangent circular arc, and a second small radius tangent circular arc tangent to said large radius tangent circular arc.

12. The trumpet of claim 11, wherein said large radius tangent circular arc has a bending radius of approximately 2.250 inches.

13. The trumpet of claim 11, wherein said first small radius tangent circular arc and said second small radius tangent circular arc share a common bending radius.

14. The trumpet of claim 13, wherein said common bending radius is approximately 0.75 inches.

15. The trumpet of claim 1, wherein said three tangent circular arcs are configured to create a premature reflection which quickens the acoustic response of said trumpet.

16. The trumpet of claim 1, wherein said trumpet has a total air column length of 55.85 inches.

17. The trumpet of claim 1, wherein said bell assembly has a wall thickness proximal said bell bead, said wall thickness being approximately fifteenth thousandths of an inch.

18. The trumpet of claim 1, further comprising a discontinuity-free mouthpiece received in said proximal end of said receiver assembly and extending therein to an intermediate location between said proximal and distal ends of said receiver assembly.

19. The trumpet of claim 18, wherein said mouthpiece includes a backbore with a diameter and taper matching said region of said leadpipe assembly having a tapered radius.

20. The trumpet of claim 18, wherein said leadpipe assembly extends into said distal end of said receiver assembly to said intermediate location, whereby there is no gap between said mouthpiece and said leadpipe assembly.

21. The trumpet of claim 18, wherein said leadpipe assembly extends into said distal end of said receiver assembly to another intermediate location between said proximal and distal ends of said receiver assembly, said intermediate location and said another intermediate location being separated by a distance which creates a gap between an end of said mouthpiece that is received in said proximal end of said receiver assembly and an adjacent end of said leadpipe assembly that is received in said distal end of said receiver assembly.

22. The trumpet of claim 21, wherein said gap defines an intermediary region of said receiver assembly having a first diameter and a first taper rate that match a second diameter and a second taper rate, respectively, of said leadpipe assembly at said adjacent end thereof.

* * * * *